(12) United States Patent
Weintraub et al.

(10) Patent No.: US 11,878,816 B2
(45) Date of Patent: Jan. 23, 2024

(54) REUSABLE MODULAR SPACECRAFT AND RELATED SYSTEMS

(71) Applicants: Scott Weintraub, Lakemont, GA (US); Nolan Coulter, Charleston, SC (US)

(72) Inventors: Scott Weintraub, Lakemont, GA (US); Nolan Coulter, Charleston, SC (US)

( * ) Notice: Subject to any disclaimer, the term of this patent is extended or adjusted under 35 U.S.C. 154(b) by 145 days.

(21) Appl. No.: 17/023,979

(22) Filed: Sep. 17, 2020

(65) Prior Publication Data
US 2021/0086918 A1 Mar. 25, 2021

Related U.S. Application Data

(60) Provisional application No. 62/903,142, filed on Sep. 20, 2019.

(51) Int. Cl.
| | |
|---|---|
| *B64G 1/22* | (2006.01) |
| *B64G 1/42* | (2006.01) |
| *B64G 1/50* | (2006.01) |
| *B64G 1/40* | (2006.01) |
| *B64G 4/00* | (2006.01) |
| *B64G 1/64* | (2006.01) |
| *B64G 1/00* | (2006.01) |

(52) U.S. Cl.
CPC ............... *B64G 1/22* (2013.01); *B64G 1/002* (2013.01); *B64G 1/402* (2013.01); *B64G 1/428* (2013.01); *B64G 1/50* (2013.01); *B64G 1/641* (2013.01); *B64G 4/00* (2013.01); *B64G 1/643* (2023.08); *B64G 2004/005* (2013.01)

(58) Field of Classification Search
CPC . B64G 9/00; B64G 1/10; B64G 1/428; B64G 2001/1092; H01R 31/005
See application file for complete search history.

(56) References Cited

U.S. PATENT DOCUMENTS

| | | | | |
|---|---|---|---|---|
| 4,896,165 A | * | 1/1990 | Koizumi | B64G 9/00 343/915 |
| 5,579,609 A | * | 12/1996 | Sallee | E04B 1/3211 52/2.13 |
| 9,994,336 B1 | * | 6/2018 | Ghassemieh | B64G 1/002 |
| 11,155,366 B2 | * | 10/2021 | Helvajian | B64G 1/641 |
| 2007/0063107 A1 | * | 3/2007 | Mueller | B64G 1/14 244/173.1 |

(Continued)

*Primary Examiner* — Valentina Xavier
(74) *Attorney, Agent, or Firm* — Peacock Law P.C.; Justin R. Jackson

(57) ABSTRACT

A reusable modular spacecraft has a spacecraft bus structure configured to support spacecraft subsystems, at least one interchangeable housing component configured to be interchangeably received and supported by the bus structure, and a wireless system configured to permit wireless communication between the at least one interchangeable housing component and spacecraft subsystems supported by the bus structure. In embodiments of the spacecraft, the wireless system includes a wireless hub and a wireless coordinator for wireless transmission of data between the at least one interchangeable housing component and the spacecraft subsystems. An electrical/power transfer interface unit is provided to the at least one interchangeable housing component for transferring electricity, power, data and/or providing thermal management and control.

18 Claims, 21 Drawing Sheets

(56) References Cited

U.S. PATENT DOCUMENTS

| | | | |
|---|---|---|---|
| 2015/0162955 A1* | 6/2015 | Burch | B64G 1/646 |
| | | | 398/118 |
| 2018/0087683 A1* | 3/2018 | Raven | B64G 1/402 |
| 2019/0023423 A1* | 1/2019 | Grübler | B64G 1/44 |
| 2019/0161213 A1* | 5/2019 | Kreisel | B64G 1/12 |
| 2020/0010221 A1* | 1/2020 | Fraze | B29C 66/20 |
| 2020/0130795 A1* | 4/2020 | Fikes | B64C 39/024 |
| 2020/0130871 A1* | 4/2020 | Drexler | B64G 1/105 |
| 2020/0354091 A1* | 11/2020 | Jaeger | B64G 1/646 |
| 2021/0086918 A1* | 3/2021 | Weintraub | B64G 1/646 |
| 2022/0063845 A1* | 3/2022 | Kline | B64G 1/428 |

* cited by examiner

REUSABLE MODULAR SPACECRAFT AND RELATED SYSTEMS

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

RELATED APPLICATION

This application claims the benefit of U.S. Provisional Patent Application No. 62/903,142, filed on Sep. 20, 2019.

BACKGROUND

Technical Field

The present invention relates generally to the field of spacecraft design, and particularly to a reusable modular spacecraft and related systems for performing a wide range of space missions.

Background Information

In the past, spacecrafts and subsystems have been bespoke designs to carry out a single mission. Currently, there is a lack of innovative rapid manufacturing capabilities due to the historically bespoke designs and redundant spacecraft systems that require full re-designs to accommodate changes to the spacecraft or to the mission. There are also numerous problems that arise from the wiring and connectors used in spacecraft as almost every manufacturer uses different types of connectors for their technologies or payloads. These problems have partially been addressed with lower-cost smaller spacecraft, such as CubeSats, but even these smaller spacecrafts still face the same connector problems as well as volume and mass constraints. Once the spacecraft's missions are completed, the spacecrafts are deemed to be at their end-of-life. All subsystems for each particular spacecraft are designed to the constraints of that mission with no ability for reusability, adaptability, or interchangeability of subsystems or payloads.

Another problem with such existing spacecrafts and subsystems deals with the incorporation of new technologies or payloads during late stage manufacturing which is extremely costly, and time consuming for bespoke spacecraft and often causes the mission to be delayed. This can be seen in large government or commercial satellites who see missions often pushed back 1-3 years due to late stage re-designs or subsystem anomalies during testing and integration. Additionally, continuation of the lifetime of a spacecraft in the event of a malfunction has required the launch of a similar spacecraft to replace the malfunctioned spacecraft. The rebuild and replace model is a never-ending loop that leads to a constant replenishment of spacecraft to keep failing or low-fuel spacecraft replenished so that spacecraft operators do not create gaps in their services.

In recent years, there has been numerous modular spacecraft proposed to support various technologies and missions to help alleviate these problems. However, these designs were limited to their ability to support future technologies by forcing the new technologies to conform to their standard connectors, size, power, and mass. These spacecrafts are also subjected to the complexities of mass prone wiring, harnesses, and connectors. These problems have been a limiting factor that has caused a slow adaptation to modular satellites and have caused a lack of adoption of a standardized universal spacecraft bus. These older modular spacecrafts are more efficient and cost effective to manufacture over bespoke designs, but severely limit future technological advancements and mission types due to conformity issues to their connectors, sizes, power, and mass restrictions. These older modular spacecrafts are also inherently difficult to test and certify for space flight due to a variety of types of wires and connectors which add complexity to integrating the subsystems and payloads. Furthermore, these varying connectors lead to repairing or replacing components on-orbit a significant challenge, even if the spacecraft is modular, due to the wires and connectors varying across subsystems and payloads. In other words, the on-orbit servicing vehicle must ensure that it has all types of connectors on board and extremely complex robotic arms and end-effector tools in order to refresh the older systems.

In view of the foregoing, there is a need for a modular reusable spacecraft design which overcomes the foregoing drawbacks of the conventional art.

SUMMARY

The present invention is directed to a reusable spacecraft design having a modular construction to permit rapid assembly and testing and support on-orbit servicing.

In one aspect, the present invention is directed to a reusable modular spacecraft comprising a spacecraft bus structure configured to support spacecraft subsystems, at least one interchangeable housing component configured to be interchangeably received and supported by the bus structure, and a wireless system configured to permit wireless communication between the at least one housing component and spacecraft subsystems supported by the bus structure.

In an embodiment, the bus structure has one of a polygonal configuration, an octagon-shaped configuration, a generally decagon-shaped configuration, and a generally square-shaped configuration.

In an embodiment, the wireless system is configured to be mounted to the at least one housing module and/or the bus structure.

In an embodiment, the bus structure has at least one compartment with an opening for receiving and supporting therein the at least one housing component. In another embodiment, the at least one compartment comprises a plurality of compartments each provided with an opening for selectively receiving and supporting therein the at least one housing component.

In another embodiment, the at least one interchangeable housing component comprises a plurality of interchangeable housing components, and the bus structure comprises a plurality of compartments each provided with an opening for selectively receiving and supporting therein a respective one of the housing components. In yet another embodiment, the bus structure has a plurality of sides provided with the respective compartment openings. In still another embodiment, a top of the bus structure is provided with additional compartment openings for receiving respective housing components. In these embodiments, the wireless system is configured to be mounted to the plurality of interchangeable housing components and/or the bus structure.

In yet another embodiment, the bus structure is polygonal shaped, with each of the sides of the bus structure having two compartment openings for receiving two respective housing components and each of the remaining sides of the bus structure having a single compartment opening for receiving one of the housing components. In this embodiment, the housing components that are received by the respective single compartment openings of the bus structure have a triangular-shaped configuration to define corner housing components. In an alternative embodiment, the housing components that are received by the respective single compartment openings of the bus structure have a square- or rectangular-shaped configuration for accommodating more internal volume.

In yet another embodiment, each compartment of the bus structure is provided with a track system configured to receive and position a corresponding housing component within the compartment.

In a further embodiment, the bus structure and each housing component has an elongated configuration. In an exemplary embodiment, each elongated housing component is configured with an internal structure, external mounting point, electrical/power interface, and track system that lines up with the bus structure track system to allow for proper alignment during assembly or removal of the housing components relative to the bus structure.

In the spacecraft according to any or all of the foregoing embodiments, the wireless system comprises wireless connectors, for example, a wireless hub (e.g., wireless router) and a wireless coordinator.

In an exemplary embodiment, the wireless system comprises a wireless router within each housing component and a wireless coordinator for transferring data among and between the housing components.

In one embodiment, the spacecraft further comprises a standardized electrical/power transfer interface unit associated with each housing component for transferring electricity, power, data and/or providing thermal management/control among and between the housing components.

In another embodiment, the spacecraft further comprises fill-and-drain valves and other supporting technologies configured to accommodate on-orbit servicing.

In yet another embodiment, the spacecraft further comprises a propulsion system, refueling valve, and/or propulsion storage tanks removably mounted to the bus structure.

In the spacecraft according to any or all of the foregoing embodiments, each of the interchangeable housing components comprises, in one embodiment, an on-orbit replaceable unit (ORU). The ORU is a modular structure configured to house spacecraft subsystems that can be interchanged on-orbit by human mission specialists and/or suitable robotics.

According to a feature of the embodiments of the present invention, each ORU is configured to compartmentalize entire subsystems, payloads, on-orbit servicing technologies, or propulsion systems. Each ORU can be easily interchanged (e.g., removed and replaced relative to the bus structure) utilizing on-orbit servicing components including, but not limited to, existing robotic arms and docking technology, and can be easily associated/provided with optical inspection hardware and a refueling valve or various required refueling technologies.

In an exemplary embodiment, each ORU has the ability to plug and play via a wireless connector of the wireless system or via a standardized radially symmetric electrical/power transfer interface component equipped on the ORU. In an alternative embodiment, the electrical/power transfer interface component may be non-radially symmetric, such as circular, trapezoidal, rectangular, or polygonal.

In another embodiment, each ORU has a generally block shape structure that is flat on all sides, except for one side which is provided with a tapered conical-shaped surface to allow the ORU to slide into a corresponding opening of the bus structure, another of the sides of the ORU having a conical indent configured to allow a servicing spacecraft to mate with the ORU for removal and replacement of the ORU on-orbit.

In another embodiment, at least one of the ORU's is a propulsion ORU and/or a ORU housing fuel that can be added to or removed from the bus structure during manufacturing, assembly, or during last minute changes. This embodiment also supports the ability to replace the propulsion ORU on-orbit or replace the ORU housing fuel, to re-refuel the spacecraft, or take the fuel from one spacecraft to another spacecraft on-orbit. An example of a possible propulsion system mounted inside an ORU includes propellant storage structures, piping, a combustion chamber, nozzles, plumbing, necessary valves, a pressure tank, and a control box.

In another embodiment, the bus structure is configured to deploy payloads and other spacecraft from storage racks and customized ORUs designed to provide all the life support and thermal management to the payloads required during launch and on-orbit operations.

According to another feature of the present invention, the combination of the bus structure, interchangeable housing components, wireless system, and optional electrical/power transfer interface provides a scalable, reusable modular spacecraft with the ability to rapidly adapt to a variety of mission architectures and to accommodate future advancements in technology without conformity or limitation to certain connectors or wiring schematics.

The spacecraft of the present invention is designed to fit in a variety of launch vehicle fairings. In an embodiment, the bus structure has a polygonal configuration and is volumetrically and geometrically scalable to allow for the accommodation of different launch vehicle fairings, ESPA rings, deployers or launch adapters. In one preferred form, the overall spacecraft has a polygonal shape that is flat on top and bottom to allow for stacking within the launch vehicle fairing of a plurality of spacecrafts according to the invention.

In another aspect, the present invention provides, in combination, a launch vehicle and at least one spacecraft according to any of the foregoing embodiments of the present invention configured for positioning in a fairing of the launch vehicle. In one embodiment of this aspect, the at least one spacecraft comprises a plurality of spacecrafts in stacked relation to one another.

In yet another aspect, the present invention provides a spacecraft according to any of the foregoing embodiments of the present invention in combination with a robotic on-orbit servicing vehicle comprising at least one robotic arm configured for attachment to the spacecraft. In an embodiment of this aspect, the robotic on-orbit servicing vehicle further comprises solar arrays.

In still another aspect, the present invention provides a spacecraft according any of the foregoing embodiments of the present invention in combination with at least one set of solar panels, thrusters, patch antennas, and attitude control system components mounted to the spacecraft.

In yet another aspect, the present invention provides a spacecraft according to any of the foregoing embodiments of the present invention in combination with an externally mounted payload storage rack configured for carrying multiple types of spacecraft (e.g., satellites) and deploying them on-orbit. In an embodiment of this aspect, the payload storage rack is configured to support a transfer interface unit or wireless router for controlling deployment of a latch, spring, or gate that physically opens or releases to deploy a satellite.

These and other advantages and features of the present invention will become more apparent from the following description taken in conjunction with the drawings.

BRIEF DESCRIPTION OF THE DRAWINGS

The foregoing summary, as well as the following detailed description of embodiments of the invention, will be better understood when read in conjunction with the accompanying drawings. For the purpose of illustrating the disclosure, there is shown in the drawings embodiments which are presently preferred. It should be understood, however, that the invention is not limited to the precise arrangement and instrumentalities shown.

FIG. 11 is an exploded view of the spacecraft shown in FIG. 9, further illustrating the modularity of the spacecraft by showcasing the housing components and compartments or open slots of the bus structure for the housing components to be assembled in or removed from;

DETAILED DESCRIPTION

Figure 1:
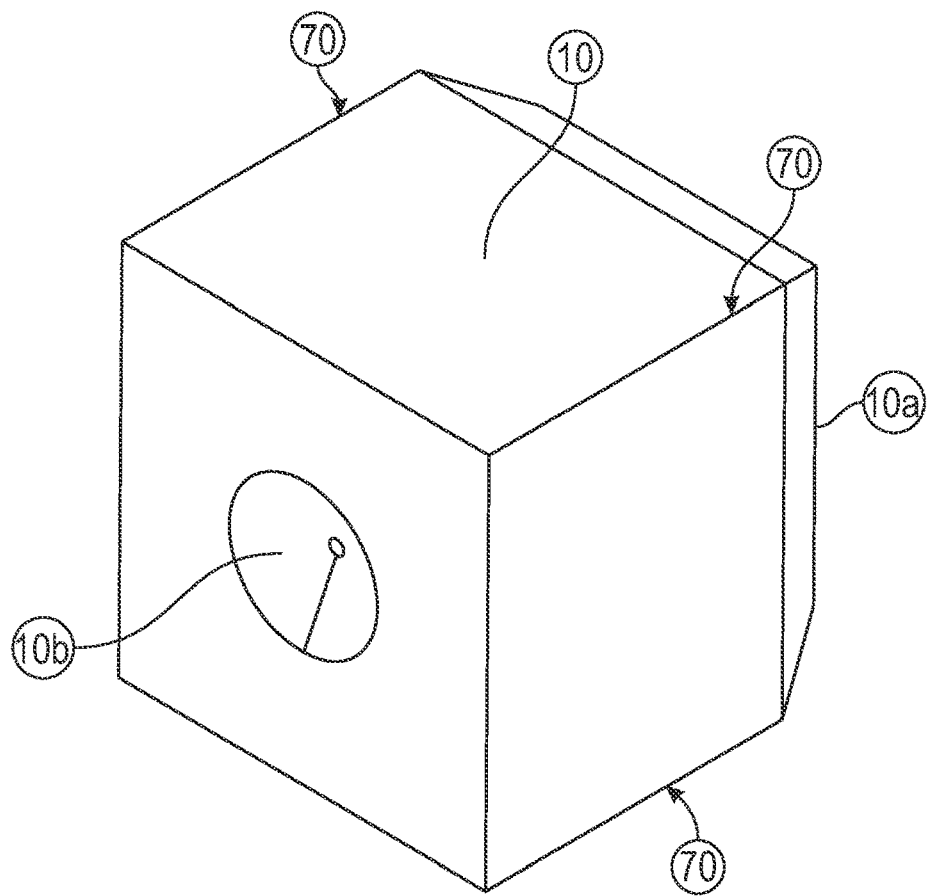
FIG. 1 is a perspective view of an interchangeable housing component according to an embodiment of the invention.

The present invention now will be described more fully hereinafter with reference to the accompanying drawings, in which exemplary embodiments of the invention are shown. This invention may, however, be embodied in many different forms and should not be construed as limited to the embodiments set forth herein; rather, these embodiments are provided so that this invention will be thorough and complete, and will fully convey the scope of the invention to those skilled in the art.

For convenience of description, the terms "front", "back", "upper", "lower", "top", "bottom", "front", "rear", "right", "left", "side" and words of similar import will have reference to the various members and components of the exercise device of the present disclosure as arranged and illustrated in the figures of the drawings and described hereinafter in detail.

It should also be understood that the terms "about," "approximately," "generally," "substantially" and like terms, which may be used herein when referring to a dimension or characteristic of a component of the present disclosure, indicate that the described dimension/characteristic is not a strict boundary or parameter and does not exclude minor variations therefrom that are functionally the same or similar, as would be understood by one having ordinary skill in the art. At a minimum, such references that include a numerical parameter would include variations that, using mathematical and industrial principles accepted in the art (e.g., rounding, measurement or other systematic errors, manufacturing tolerances, etc.), would not vary the least significant digit.

There exists a significant perceived need for a scalable wireless and/or wired modular reusable spacecraft that uses wireless connectors or wired standardized electrical/power interfaces, whereby the spacecraft is designed to easily be rapidly manufactured, assembled, and have the ability to host multiple payloads and subsystems. The spacecraft of the present invention allows for wireless connectors (e.g., wireless router, wireless coordinator) to enable the ability to quickly remove and replace technologies during manufacturing, assembly, and testing without the hassle of dealing with data wires, connectors, and their respective challenges.

By incorporating a modular bus structure with modular housing components, and due to standardization and wireless connections, the reusable modular spacecraft is highly scalable, reduces redesign costs, and accommodates last minute changes during integration and assembly, such as swapping out a faulty modular propulsion system without the need to reschedule the mission or endure expensive recurring engineering costs. The spacecraft of the present invention is also superior over traditional modular designs when it relates to on-orbit repairs, as the housing components can easily be removed and replaced or even added externally to the spacecraft on-orbit by an on-orbit servicing vehicle using adhesive, magnets, or locking/clamp mechanisms. An example would be adding an external payload with its' own solar panel so it is essentially an independent spacecraft but without the need for expensive and complex antennas; instead, this payload would wirelessly transmit its' data to the modular wireless spacecraft—which houses all the appropriate communications technology to transmit the data and commands up and down to the ground station. Important as well is the ability to support future deep space exploration with upgradeable wireless spacecraft systems which will reduce mass, costs, and manufacturing times over wired technologies.

The spacecraft of the present invention also accommodates the ability to mount spacecraft deployer modules externally or internally to allow for the deployment of other satellites from this spacecraft once in orbit by controlling the mechanisms wirelessly. Furthermore, the spacecraft of the present invention offers the ability to communicate with nearby spacecraft wirelessly without the need of expensive and complex antenna systems which add mass, costs, and complexity to the overall mission.

The present invention may be best understood by reference to the following descriptions taken in conjunction with the accompanying drawings. Throughout the description, like elements are referenced by common reference numerals.

Figure 7:
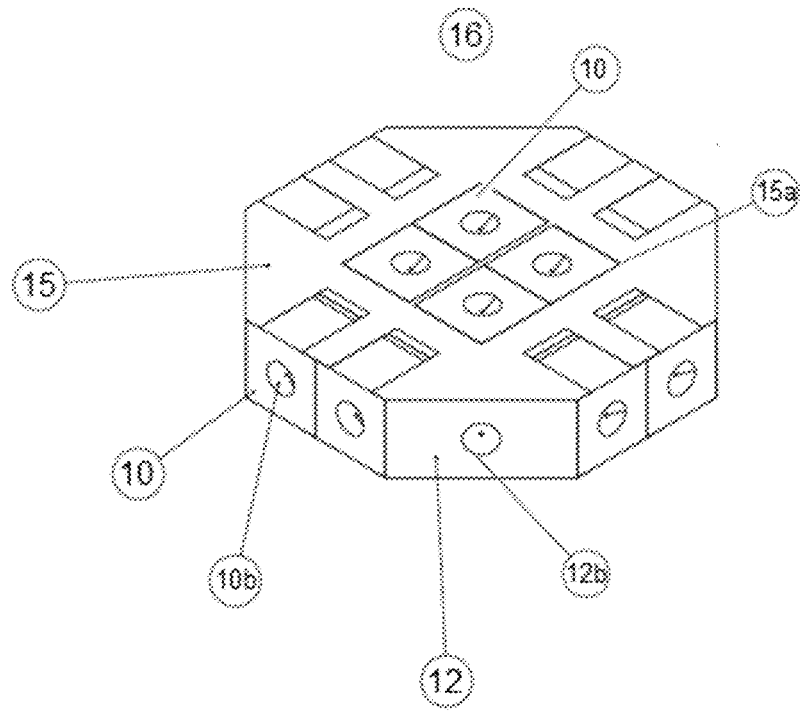
FIG. 7 is a perspective view of a reusable modular spacecraft according to one embodiment of the present invention.

FIG. 7 is a perspective view of a multipurpose, reusable, modular, and interchangeable spacecraft 16 according to an embodiment of the present invention. In this embodiment, spacecraft 16 is generally formed of a scalable, polygonal-shaped spacecraft bus structure 15 configured to support spacecraft subsystems (e.g., spacecraft hardware such as payload instruments), interchangeable housing component 10, 12 configured to be interchangeably received and supported by the bus structure 15, and a wireless system configured to permit wireless communication between the at least one housing component 10, 12 and spacecraft subsystems supported by the bus structure 15. In one embodiment, the wireless system comprises wireless connectors including a wireless hub 37 (e.g., wireless router) and wireless coordinator 38 as further described below with reference to FIGS. 18, 26 and 28. As further described below with reference to FIGS. 3-5, the spacecraft 16 according to this embodiment further comprises a standardized, radially symmetric electrical/power transfer interface unit 13 (hereinafter referred to as "transfer interface unit") associated with each housing component 10, 12 for transferring electricity, power, data and/or providing thermal management/control among and between the housing components. The spacecraft 16 of this embodiment also comprises fill-and-drain valves and other supporting technologies configured to accommodate on-orbit servicing, as further described below.

Bus structure 15 can be 3D printed, CNC machined, casted, or manufactured following various composite materials manufacturing practices. Materials for fabricating the bus structure 15 include aluminum, titanium, composites, or other types of metal configurations common to spacecraft systems. Bus structure 15 is designed for short term and long term space missions and can house multiple types of spacecraft hardware, including avionics, batteries, solar panels, on-board computers, thrusters, star trackers, navigation and ancillary data sensors, propulsion systems, payloads, externally mounted hardware and payloads, thermal management systems, and any other types of technologies common to spacecraft systems.

According to a feature of the present invention, each interchangeable housing component 10, 12 is designed to connect wirelessly to individual subsystems, wireless hubs, wireless sensor networks, and primary computer systems for data, control, and communications, and through a wired power cord for power and thermal control. The spacecraft can also accommodate additional wired connectors, such as transfer interface unit 13, in the event a wired connector would benefit the mission or specific hardware components over a wireless connection which can cause interference with certain communication payloads and communication systems. Housing components can be 3D printed, CNC machined, casted, or manufactured following various composite materials manufacturing practices. Materials for fabricating the housing components include aluminum, titanium, composites, or other types of metal configurations common to spacecraft systems.

Figure 6:
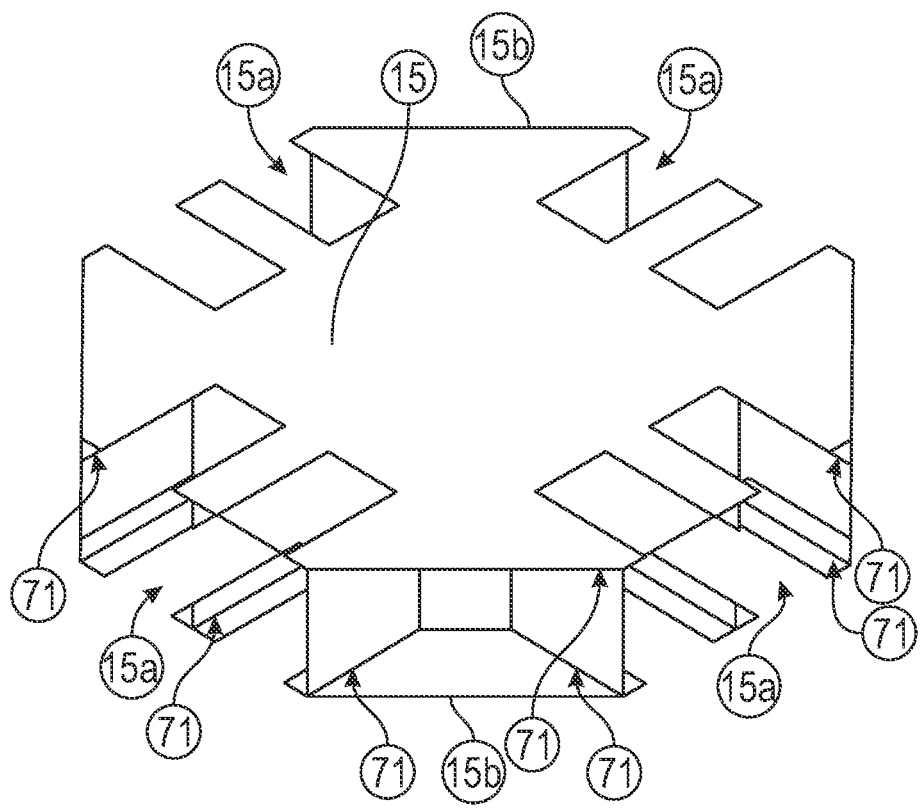
FIG. 6 is a perspective view of a bus structure according to an embodiment of the present invention.

FIG. 6 is a perspective view of bus structure 15 according to an embodiment of the present invention. Bus structure 15 is in the form of a structural body having a plurality of compartments with openings (hereinafter "open slots") 15a, 15b each configured to removably receive one of the housing components 10, 12. In an exemplary embodiment of the present invention, each of the housing components is an on-orbit replaceable unit (ORU) as a modular structure configured to house spacecraft subsystems that can be interchanged on-orbit (e.g., in space) by human mission specialists and/or suitable robotics. In one embodiment, a plurality of the open slots preferably comprise at least four inside corners 71 that are configured to receive a respective outside corner edge 70 of a respective housing component; and the spacecraft bus structure can be configured to hold respective housing components separately from other housing components (see FIGS. 1, 2, and 6). In another exemplary embodiment, each of the housing components can be other than an ORU, such as a modular structure configured to house spacecraft subsystems, etc., which may be assembled and/or undergo testing by human mission specialists and/or suitable robotics in environments other than on-orbit, such as in a testing facility not located in space.

According to a feature of the present invention, the ORUs 10, 12 compartmentalize entire subsystems or payloads, including avionics, power systems, navigation and control systems, propulsion systems, or technology payloads like cameras, antennas, sensors, and science experiments. The ORUs 10, 12 are designed to be quickly and easily assembled and mounted into the spacecraft bus structure during manufacturing, assembly, and integration/testing by humans or robotic arms which grab onto the ORUs by their corresponding conical indents 10b, 12b.

Figure 4:
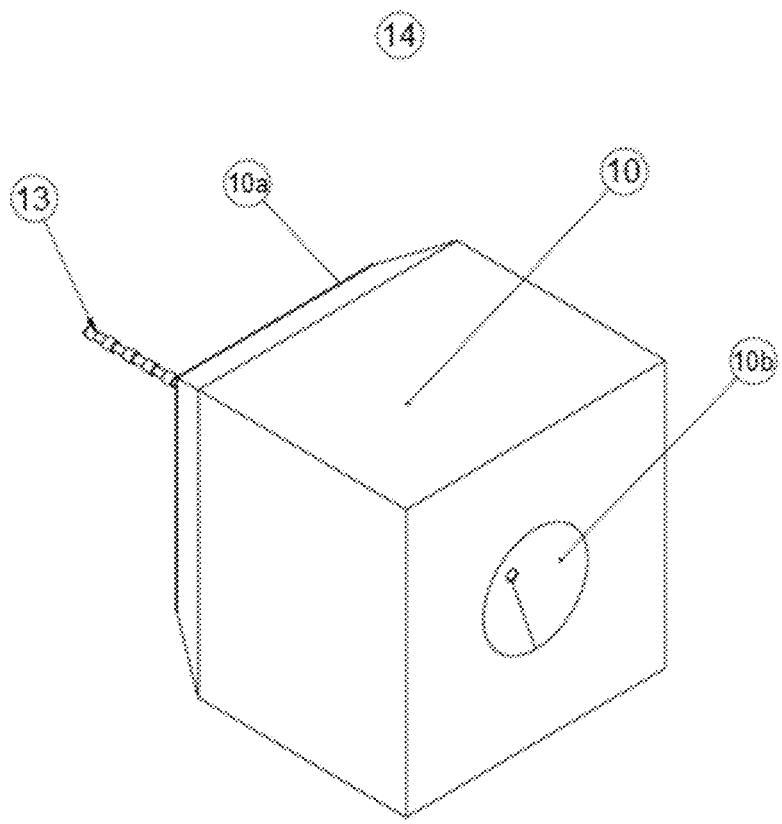
FIG. 4 is a perspective view of the interchangeable housing component in FIG. 1 with the standardized electrical/power transfer interface unit of FIG. 3 installed.
Figure 5:
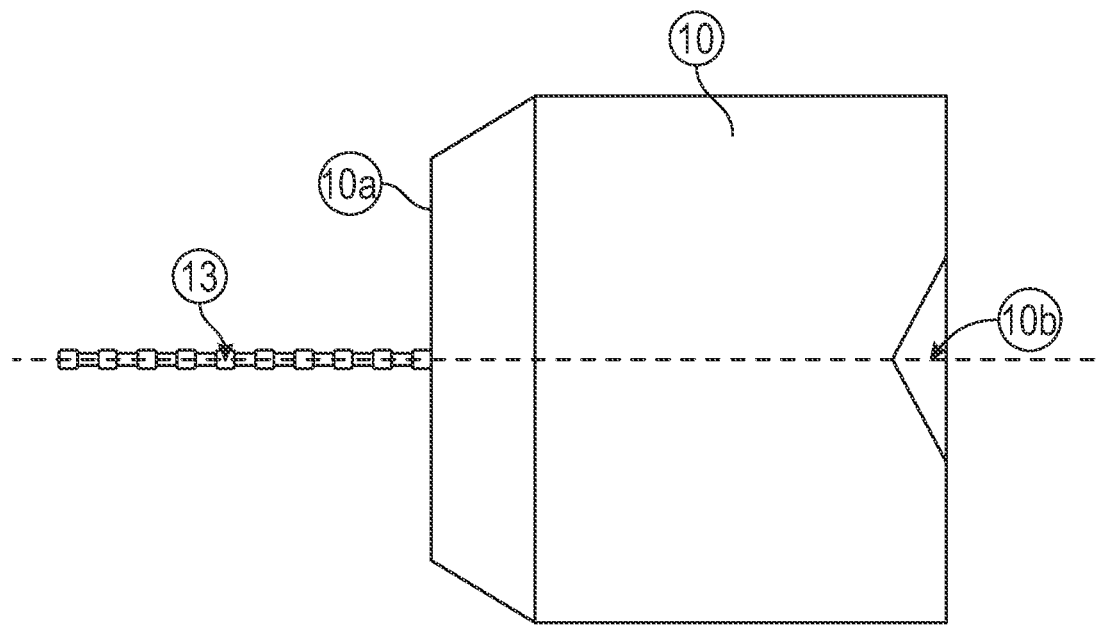
FIG. 5 is a side view of the interchangeable housing component in FIG. 4.

Furthermore, the ORUs 10, 12 are capable of being easily removed and replaced in space relative to the bus structure using a robotic on-orbit servicing vehicle 40 as further described above with reference to FIG. 14. For this purpose, vehicle 40 is equipped with on-orbit servicing components to include robotic arms, laser and camera inspection hardware, and on-orbit refueling technology. The ORUs have the ability to plug and play via the above-referenced wireless connectors (e.g., wireless router 37 and wireless coordinator 38 shown in FIGS. 18 and 26-28), or via the transfer interface unit 13 which is configured to be mounted, for example, on a rear side of each ORU as shown in FIGS. 4-5. According to a feature of the present invention, the combination of the bus structure, ORUs, wireless connectors, and transfer interface unit creates a reusable, modular, and interchangeable spacecraft that has the ability to be rapidly manufactured by humans or automated machinery, adaptive to a variety of mission architectures, and to be upgraded, repaired, or refueled on-orbit.

For simplicity of description and understanding, the interchangeable housing components of the various embodiments of the present invention described below with reference to the drawings will be referred to as ORU (singular) or ORUs (plural). It is understood, however, that the following descriptions of embodiments of the present invention are also applicable to interchangeable housing components other than ORUs, such as modular structures configured to house spacecraft subsystems, etc., which may be assembled and/or undergo testing by human mission specialists and/or suitable robotics in environments other than on-orbit (e.g., in a testing facility not located in space), as set forth above.

FIG. 1 is a perspective view of one embodiment of the ORU, generally designated at 10, according to the present invention. ORU 10 is a generally block shape structure that is flat on all sides, except for the back of the ORU 10 which is provided with a tapered conical-shaped surface 10a to allow for the wireless router 37 (FIGS. 18, 26-27) or the transfer interface unit 13 to be mounted and connect to the bus structure 15a. The front of ORU 10 has a conical indent 10b that is designed to be grabbed by a human or robotic arm by extending an end effector/grappler into the indent to latch on and manipulate the ORU during manufacturing and assembly or on-orbit to allow a servicing spacecraft to mate with ORU 10 in order to remove and replace them from the spacecraft bus on-orbit.

Figure 2:
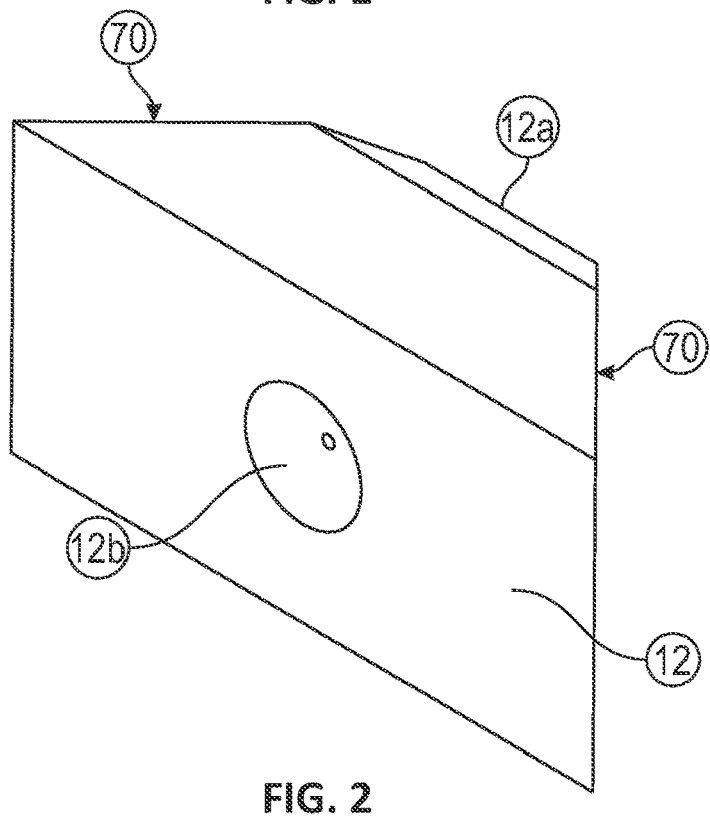
FIG. 2 is a perspective view of an interchangeable housing component according to another embodiment of the invention.

FIG. 2 is a perspective view of another embodiment of the ORU, generally designated at 12, according to the present invention. ORU 12 is a corner ORU in the general form of a triangle shape that is flat on all sides, except for a back of corner ORU 12 which is provided with a tapered conical-shaped surface 12a to allow for the wireless router 37 (FIGS. 18, 26-27) or the transfer interface unit 13 to be mounted and connect to the bus structure 15a of bus structure 15. The front of the corner ORU 12 has a conical indent 12b that is designed be grabbed by a human or robotic arm by extending an end effector into the indent to latch on and manipulate the ORU during manufacturing and assembly or on-orbit to allow a servicing spacecraft to mate with ORU 12 in order to remove and replace them from the spacecraft bus on-orbit.

Referring again to FIG. 6, in this embodiment bus structure 15 has a generally octagonal-shaped configuration. Each of four sides of bus structure 15 is provided with a pair of adjacent openings 15a configured to receive two ORUs 10, respectively, as shown in FIG. 7. Each of the remaining four sides of bus structure 15 is provided with one opening 15b configured to receive one ORU 12. Each opening 15b is interposed between and adjacent to two sides of bus structure 15 provided with the pair of openings 15a.

Figure 3:
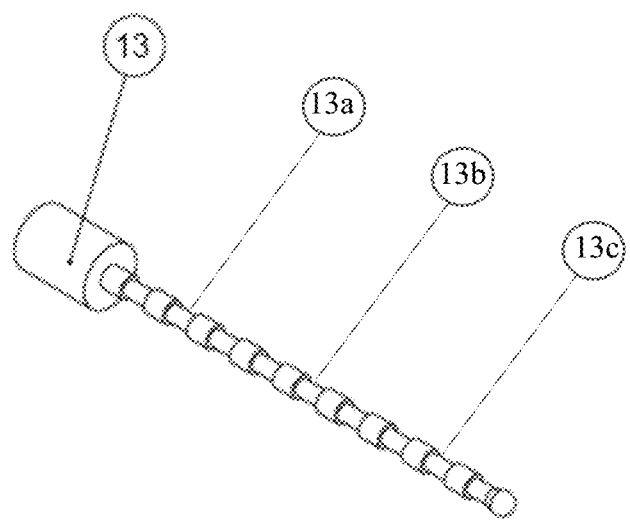
FIG. 3 is a perspective view of a standardized electrical/power transfer interface unit according to an embodiment of the present invention.

FIG. 3 is a perspective view of transfer interface unit 13. As shown in FIG. 3, transfer interface unit 13 has connection terminals or plug portions 13a, 13b, 13c, . . . (nine in this embodiment) extended to allow for additional connection points to transfer electricity (e.g., at 13a), data (e.g., at 13b), power (e.g., at 13c), thermal control (not shown) and a variety of other connection points in the remaining connection points not labeled. It should be known, plug portions designated by 13a, 13b, and 13c are exemplary and for visual purposes only as any one of the nine connection terminals on the transfer interface unit 13 can be wired to accommodate the same connection points. This is further evidence that the transfer interface unit 13 can be accommodated to support virtually any subsystem or payload when used in connection with the wireless router 37 and wireless coordinator 38 (FIGS. 18, 26-28). The ORUs have the ability to plug and play via transfer interface unit 13 equipped on the ORUs which are mounted to the bus structures as described above. Transfer interface unit 13 can also be used to provide power only, when the spacecraft bus is using wireless router 37 and wireless coordinator 38 (FIGS. 18, 26-28). The transfer interface unit 13 or another version (not shown) is used in conjunction with the wireless connectors in order to provide the necessary electrical/power/thermal control to the ORUs, external payload racks, external payloads, and external subsystems. Due to the standardized design, transfer interface unit 13 or similar versions allow for simplified assembly and integration and simplified on-orbit servicing of the spacecrafts.

FIG. 4 is a perspective view and FIG. 5 is a side view of ORU 10 with transfer interface unit 13 installed. Bus structure 15 is provided with a socket portion or similar connecting structure (not shown) for receiving a plug portion of transfer interface unit 13 to allow for simple plug and play of ORU 10 with bus structure 15 via transfer interface unit 13. It will be appreciated that instead of a plug portion, transfer interface unit 13 may be provided with a wireless router 37 and wireless coordinator 38 (FIGS. 18, 26-28), or a similar interface structure to transfer interface unit 13, without departing from the spirit and scope of the invention.

FIG. 7 is a perspective view of a spacecraft 16 according to another embodiment of the invention. In FIG. 7, bus structure 15 has the same general structural configuration as the bus structure shown in FIG. 6, except that bus structure 15 in FIG. 7 is additionally provided with openings 15a at a generally central portion of bus structure 15 for receiving four additional ORUs 10 for avionics, payloads, or the modular propulsion module. FIG. 7 shows how ORUs 10, 12 are loaded into bus structure 15. Spacecraft 16 is an embodiment to show the flexibility of the bus structure to accommodate more ORUs 10 or accommodate the modular propulsion system where ORUs 10 are located. Bus structure 15 is configured to accommodate both wireless router 37 and wireless coordinator 38 (FIGS. 18, 26-28) or transfer interface units 13.

Figure 8:
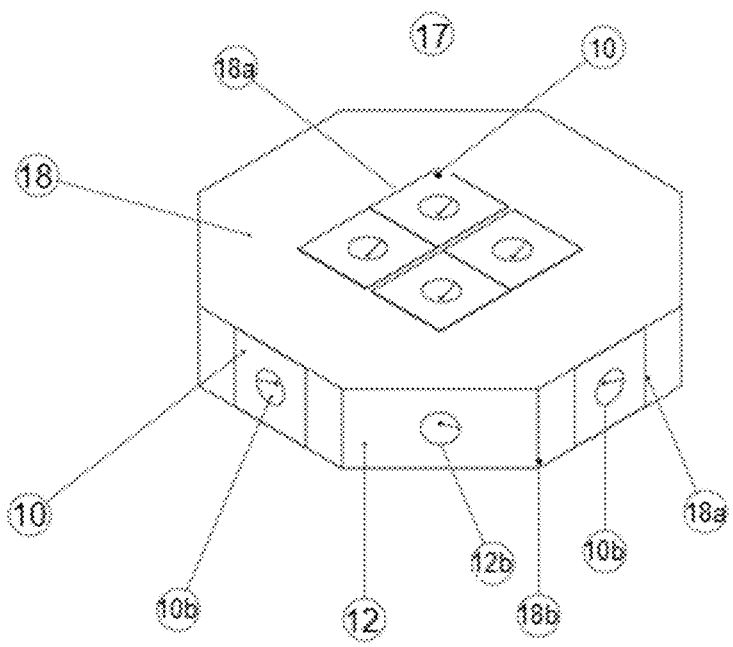
FIG. 8 is a perspective view of a reusable modular spacecraft according to another embodiment of the present invention.

FIG. 8 is a perspective view of a spacecraft 17 according to another embodiment of the invention. Spacecraft 17 includes a bus structure 18 and ORUs 10 with conical indents 10b and ORUs 12 with conical indents 12b. Bus structure 18 has the same general structural configuration as bus structure 15 in FIG. 7, except that bus structure 18 has a generally flat top, bottom and sides, with each side being provided with only one opening 18a or 18b configured to receive a corresponding one of the ORUs 10, 12 as shown in FIG. 8. Bus structure 18 shows the scalability of the bus structure to accommodate a variety of payloads or subsystem sizes by adjusting the bus structure 18 and ORUs 10, 12 to accommodate various subsystems. Bus structure 18 is configured to accommodate both wireless router 37 and wireless coordinator 38 (FIGS. 18, 26-28), or transfer interface units 13.

Figure 9:
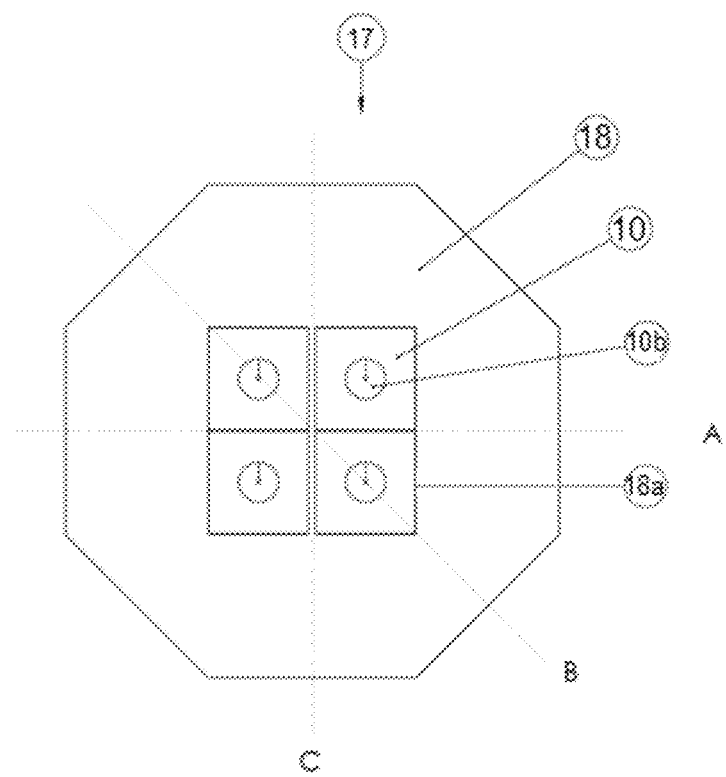
FIG. 9 is a bottom view of the spacecraft shown in FIG. 8 and further illustrating the symmetrical nature of the spacecraft.

FIG. 9 is a bottom view of spacecraft 17 shown in FIG. 8 and further illustrating the symmetrical polygonal nature of bus structure 18 according to the present invention. Specifically, spacecraft 17 in FIG. 8 is symmetrical about lines A (width), B (length) and C (diagonal) shown in FIG. 9. The symmetrical nature of spacecraft 17 according to the present invention is of importance as it is a key feature to the simplistic satellite design approach that differs it from other satellite systems. This symmetrical nature is a characteristic of all of the embodiments of the spacecrafts according to the present invention described herein.

Figure 10:
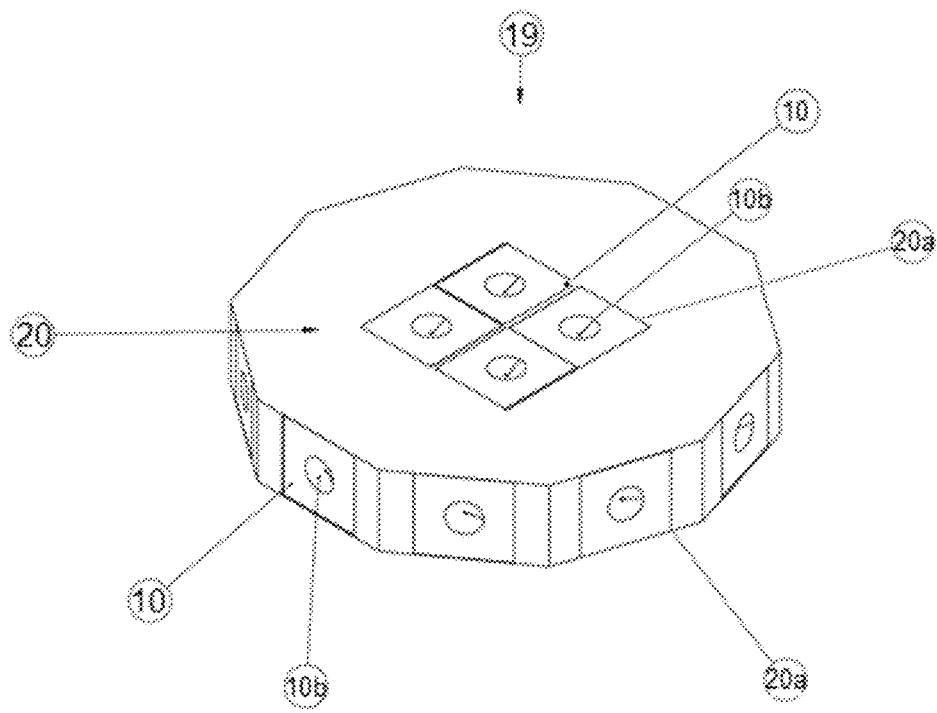
FIG. 10 is a perspective view of a reusable modular spacecraft according to another embodiment of the present invention.

FIG. 10 is a perspective view of a spacecraft 19 according to another embodiment of the invention. Spacecraft 19 includes a bus structure 20 and ORUs 10 with conical indents 10b. In this embodiment, bus structure 20 has a polygonal, specifically a decagon-shaped configuration with each side of the decagon having openings 20a, as described above for opening 15a in FIG. 6, each configured to receive one of the ORUs 10. Bus structure 20 is also provided with openings 20a at a generally central portion of bus structure 20 for receiving four additional ORUs 10 as shown in FIG. 10. This embodiment further illustrates an advantageous feature of the design of the spacecraft according to the invention which allows it to geometrically and volumetrically scale.

Figure 11:
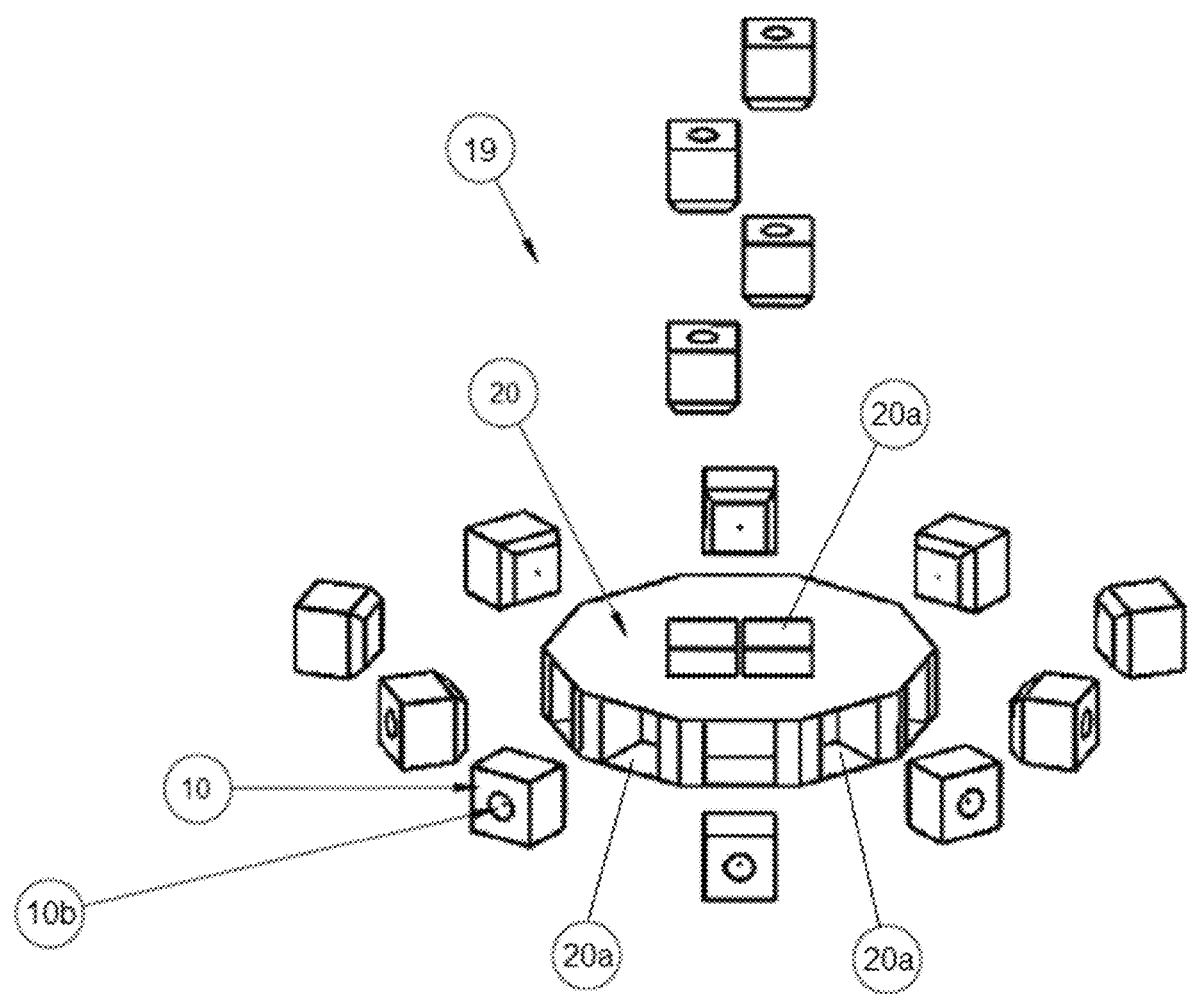

FIG. 11 is an exploded view in perspective of the spacecraft 19 shown in FIG. 10 illustrating ORUs 10 removed from corresponding openings 20a of bus structure 20. This figure further illustrates the modularity of spacecraft 19. Although not specifically shown in the figures, the ORU's are configured to slide into place on tracks provided in the openings of bus structure 20.

Figure 12:
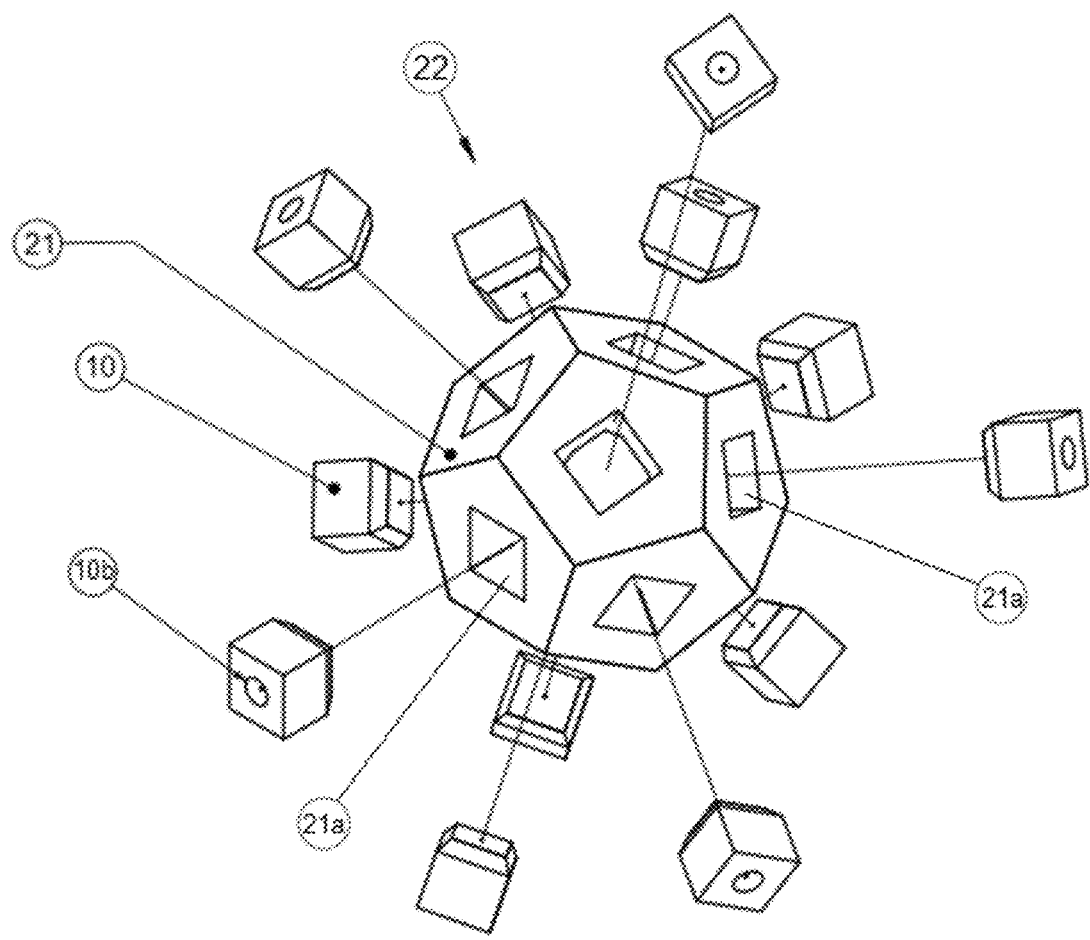
FIG. 12 is an exploded view of a spacecraft according to another embodiment of the present invention.

FIG. 12 is an exploded view in perspective view of a polygonal spacecraft 22 according to another embodiment of the invention. Spacecraft 22 includes a bus structure 21 and ORUs 10 with conical indents 10b. Bus structure 21 includes openings 21a, as described above for openings 15a in FIG. 6, each configured to receive one of the transfer interface units 13 or wireless router 37 (FIGS. 18, 26-27) inside or mounted to the ORUs 10. This embodiment further illustrates the mobility of ORUs 10 which can enter openings 21a from any orientation.

Figure 13:
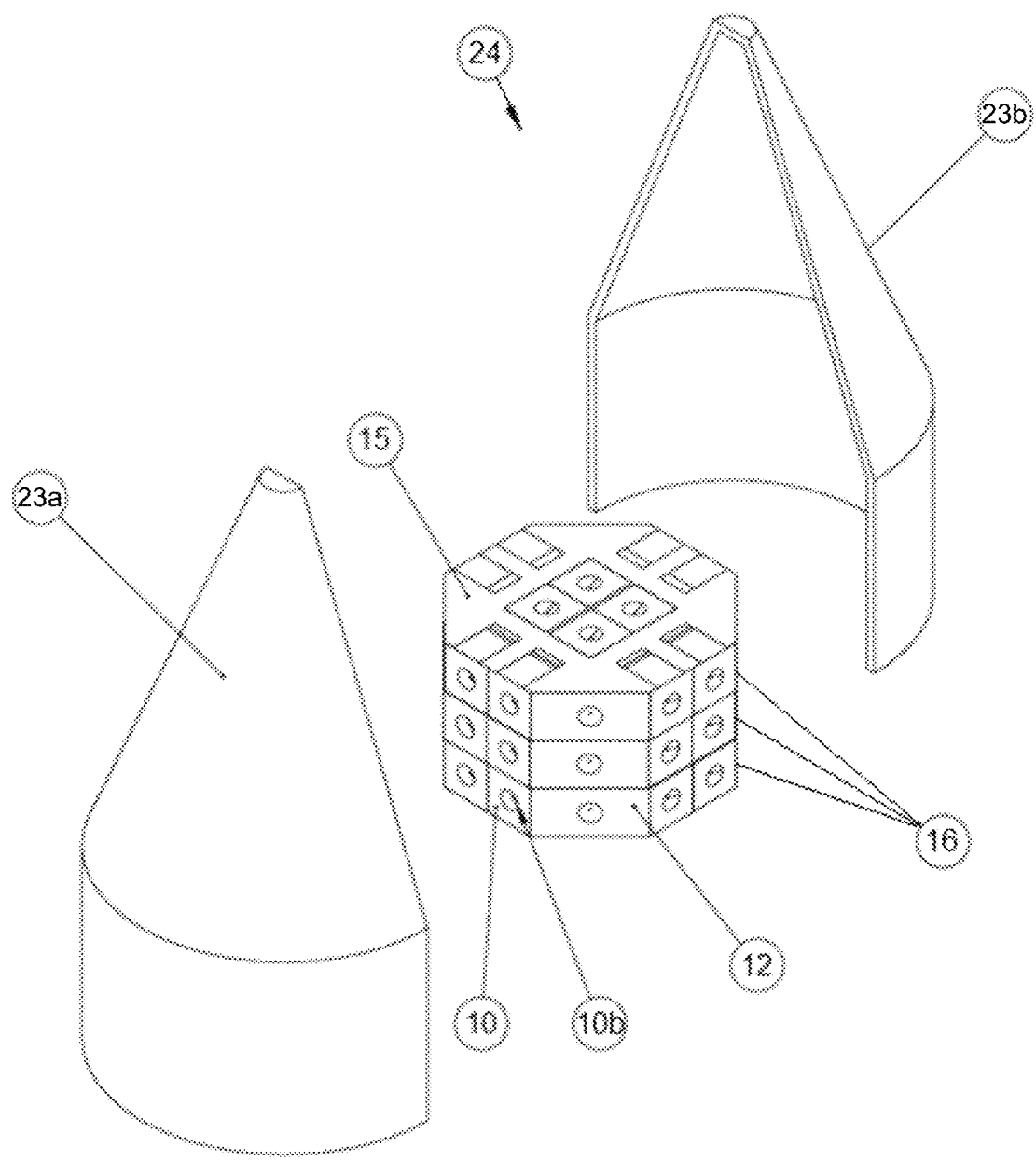
FIG. 13 is an exploded view, in perspective, showing three, vertically stacked spacecrafts of the type shown in FIG. 7 positioned for placement in a fairing of a launch vehicle in an embodiment of the present invention.

FIG. 13 is a perspective view of a system 24 including multiple spacecrafts 16 shown in FIG. 7 stacked together for positioning in a launch vehicle fairing 23a, 23b. In this embodiment, three spacecrafts 16 are stacked together as shown in FIG. 13, however, it is understood that two or more than three spacecrafts 16, or any of the other embodiments of the spacecrafts described herein, can be stacked together for positioning in launch vehicle fairing 23a, 23b without departing from the spirit and scope of the invention. The ability to stack multiple spacecrafts as described and shown herein is another advantageous feature of to the present invention.

Figure 14:
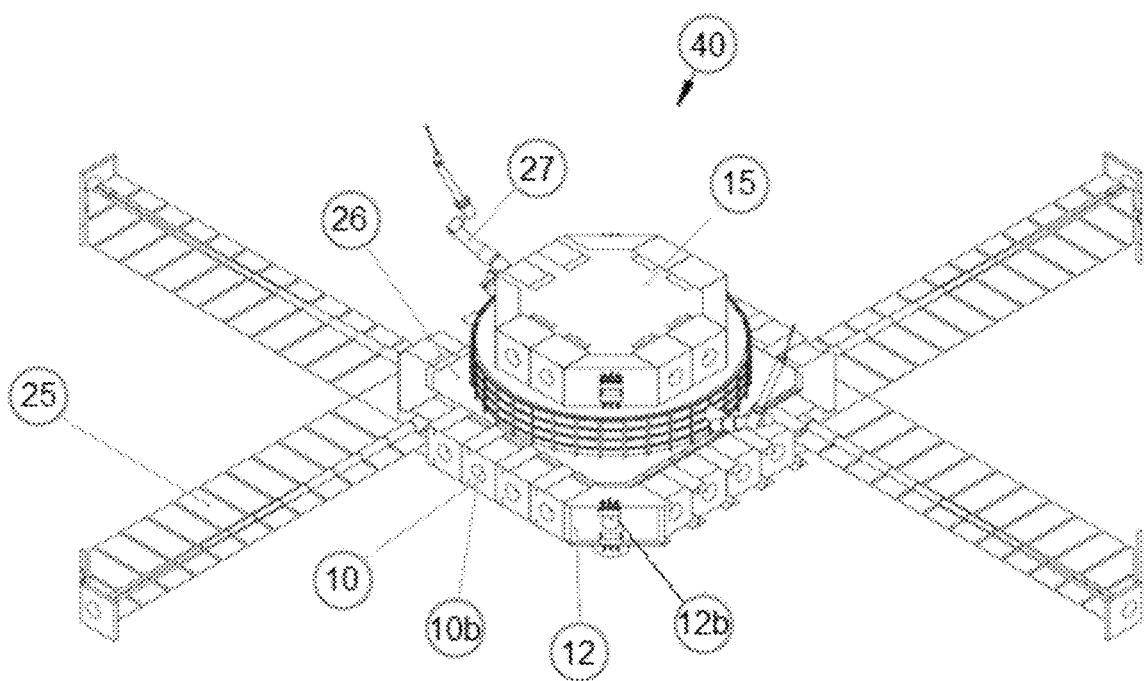
FIG. 14 is an isometric view of one embodiment of a multipurpose, reusable, modular, and interchangeable robotic on-orbit servicing vehicle incorporating the reusable modular spacecraft according to the present invention.

FIG. 14 is a perspective view of a robotic on-orbit servicing vehicle 40 according an embodiment of the present invention. Vehicle 40 is equipped with robotic arms 27 that are attached to a track that sits atop a flat surface of a spacecraft 26 including bus structure 15 and ORUs 10, 12 according to the present invention. Vehicle 40 also includes solar arrays 25 as shown in FIG. 14. Vehicle 40 can accommodate a multitude of wireless routers 37 and wireless coordinators 38 (FIGS. 18, 26-28) or transfer interface units 13 that connect to the ORUs which house the avionics, payloads, batteries, propulsion units, or any variety of potential technologies to support the on-orbit maneuvering, capture, grappling, docking, repairs, servicing, refueling, storing, or orbital relocation capabilities.

Figure 15:
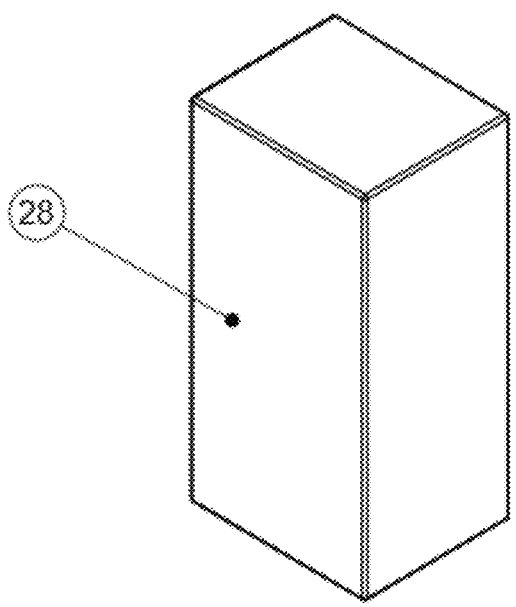
FIG. 15 is a perspective view of an elongated housing component according to another embodiment of the present invention.

FIG. 15 is a perspective view of an ORU 28 according to another embodiment of the present invention. ORU 28 has an elongated form as compared to the previously described ORUs to illustrate the flexibility in ORU design/dimension for the spacecrafts according to the present invention. ORU 28 can be wireless (e.g., via routers 37 and wireless coordinators 38 as shown in FIGS. 18, 26-28), wired (e.g., via transfer interface unit 13 shown in FIGS. 3-5), or have a combination of wireless and wired capabilities and can accommodate a variety of spacecraft bus designs.

Figure 16:
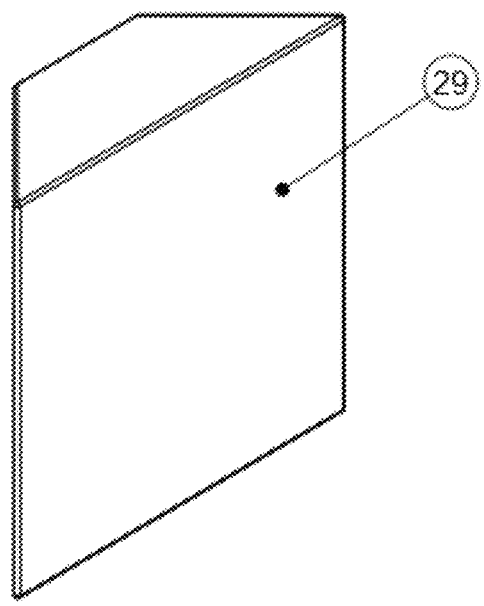
FIG. 16 is a perspective view of an elongated corner housing component according to another embodiment of the present invention.

FIG. 16 is a perspective view of a corner ORU 29 according to another embodiment of the present invention. Corner ORU 29 has an elongated form as compared to the previously described corner ORUs to illustrate the flexibility in ORU design/dimension for the spacecrafts according to the present invention. ORU 29 can be wireless (e.g., via routers 37 and wireless coordinators 38 as shown in FIGS. 18, 26-28) or wired (e.g., via transfer interface unit 13 shown in FIGS. 18, 26-28), or have a combination of wireless and wired capabilities. ORU 29 is configured to provide mounting points for docking mechanisms for on-orbit servicing or core mounting points for solar panel assemblies, robotic arms, external payloads, or external spacecraft deployment systems. ORU 29 is also configured to house a variety of subsystems and accommodate a variety of spacecraft bus designs.

Figure 17:
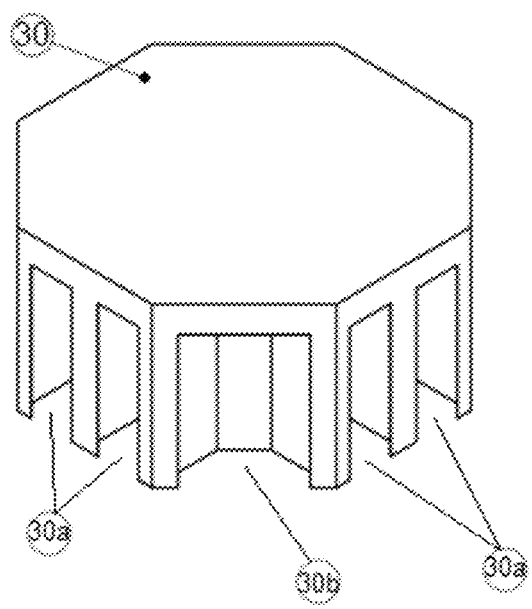
FIG. 17 is a perspective view of a bus structure according to another embodiment of the present invention.

FIG. 17 is a perspective view of a bus structure 30 according to another embodiment of the present invention. Bus structure 30 has an elongated form as compared to the previously described bus structures to illustrate the flexibility in bus structure design/dimension for the spacecrafts according to the present invention. Bus structure includes openings 30a, 30b configured to receive corresponding ORUs shown in FIGS. 15 and 16 as described above. Bus structure 30 is a representation of the ability for the spacecraft bus to accommodate various sides subsystems, payloads, or on-orbit servicing technologies by elongating the structure to accommodate large sized technologies. Bus structure 30 follows the polygonal nature of the previous embodiments.

Figure 18:
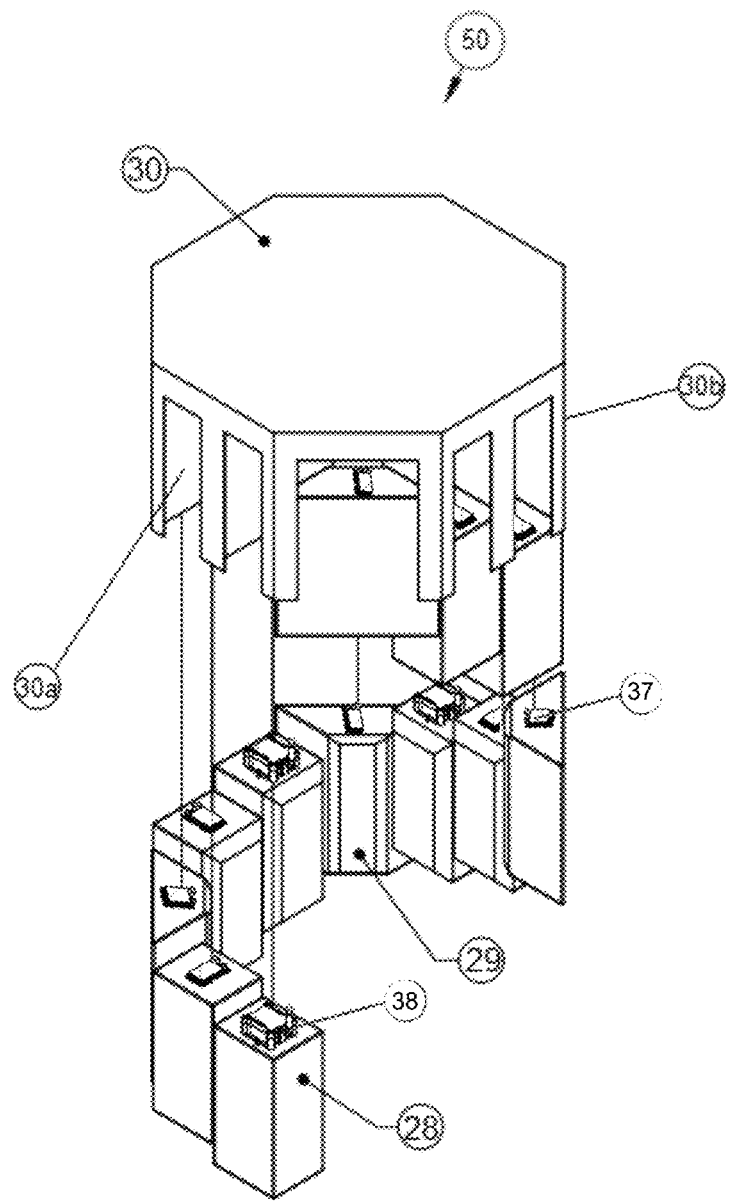
FIG. 18 is an exploded view of a spacecraft illustrating wireless connectors mounted to housing components of FIGS. 15 and 16 and the manner of placement of such housing components into compartments or open slots of the bus structure shown in FIG. 17, according to an embodiment of the present invention.

FIG. 18 is an exploded view in perspective showing a spacecraft 50 according to another embodiment of the present invention. Spacecraft 50 includes elongated bus structure 30 and elongated ORU's 28 and 29 configured for positioning relative to respective openings 30a, 30b of bus structure 30. This figure is primarily showing the ORUs and how they are configured to slide in or out on the track system, which is not shown. The ORUs 28 show the wireless routers 37 and wireless coordinators 38 mounted to them with a separate electrical interface (not shown) instead of the transfer interface unit 13. The ORUs can be assembled or removed by humans, robotics, or other mechanisms to support or aid in the manufacturing, assembly, and testing processes. The ORUs can also be removed, replaced, or added with an on-orbit servicing vehicle 40 described above with reference to FIG. 14. FIG. 18 further illustrates the modularity of the spacecrafts according to the present invention.

Figure 19:
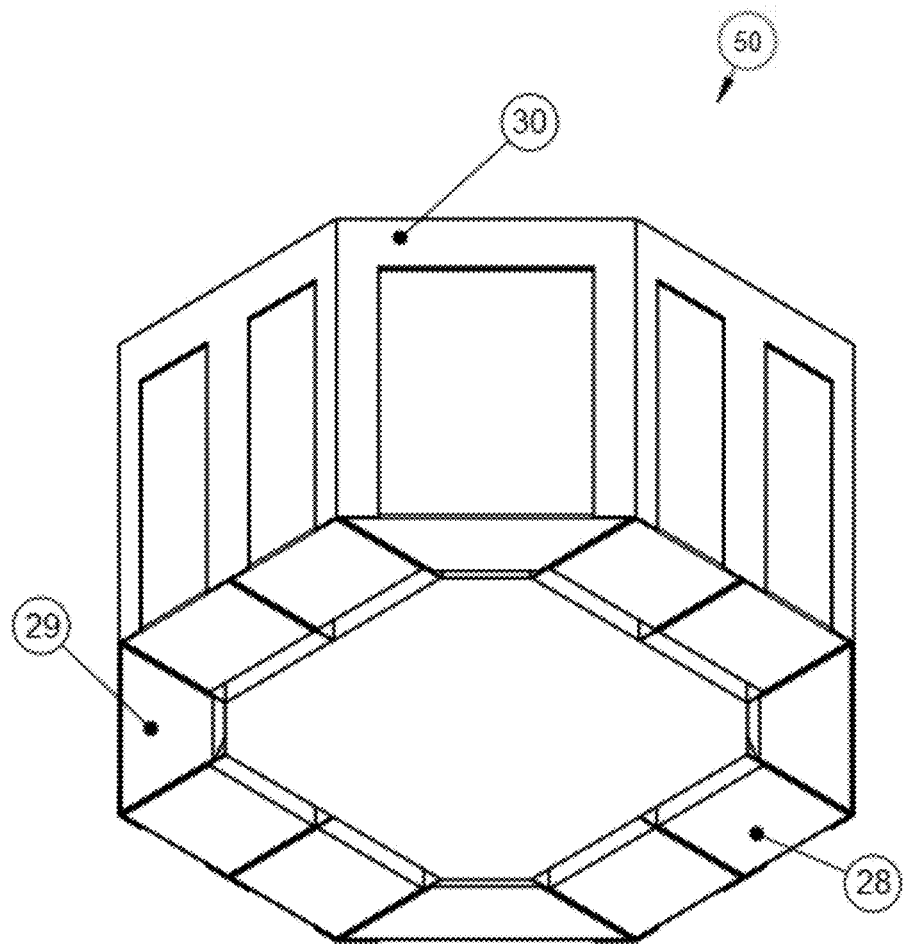
FIG. 19 is a perspective view illustrating the spacecraft of FIG. 18 in an assembled state.

FIG. 19 is a perspective view of spacecraft 50 showing ORUs 28 and 29 positioned in respective openings 30a, 30b of bus structure 30. FIG. 19 illustrates the polygonal and symmetric nature of spacecraft 50. Although spacecraft 50 shows eight ORUs 28 and four ORUs 29, it will be appreciated that there may be more or less ORUs added or removed depending on the mission needs.

In the embodiment of FIGS. 17-19, elongated bus structure 30 has a geometric octagonal-shaped configuration. It is understood, however, that the elongated bus structure can be configured with a shape other than octagonal, such as any type of polygonal shape, or geometric shape, such as the shapes described above with reference to FIGS. 10-12 and can house a variety of other ORUs.

Figure 20:
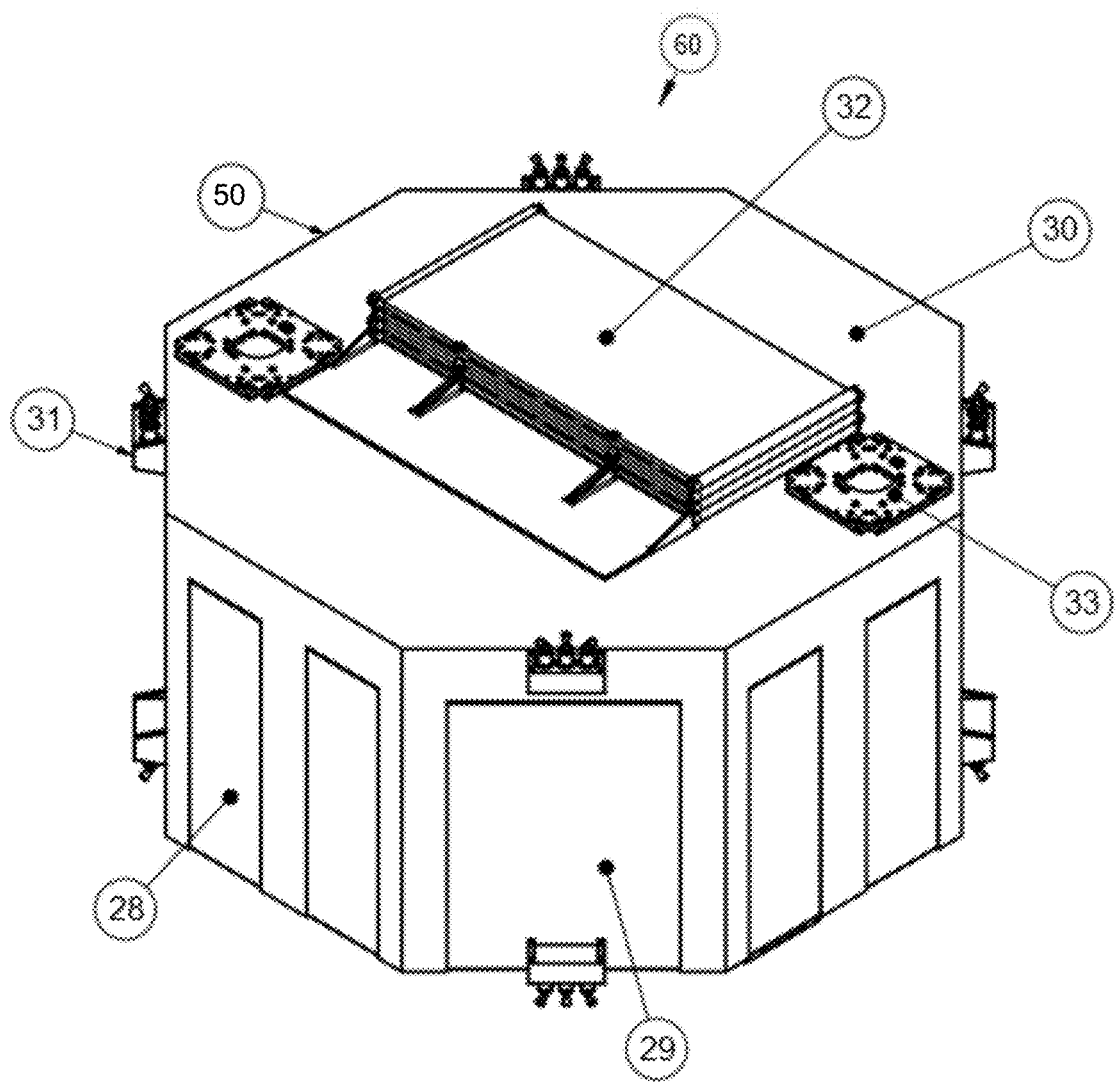
FIG. 20 is a perspective view of the spacecraft in FIG. 18 and FIG. 19 incorporating solar panels, patch antennas, and thrusters according to another aspect of the present invention.

FIG. 20 is a perspective view of a system 60 according to an embodiment of the present invention. System 60 includes spacecraft 50 as described above with reference to FIGS. 18-19 with each opening of bus structure 30 filled with corresponding ORUs 28 and 29, wireless routers 37 (FIG. 18), wireless coordinators 38 (FIG. 18) and transfer interface units 13 (FIGS. 3-5). System 60 further includes solar panels 32, thrusters 31, and patch antennas 33 as shown in FIG. 20. FIG. 20 illustrates the ability for the modular satellite bus to accommodate technologies or payloads inside the wired or wireless ORUs 28 and 29 or support subsystems or technologies externally.

Figure 21:
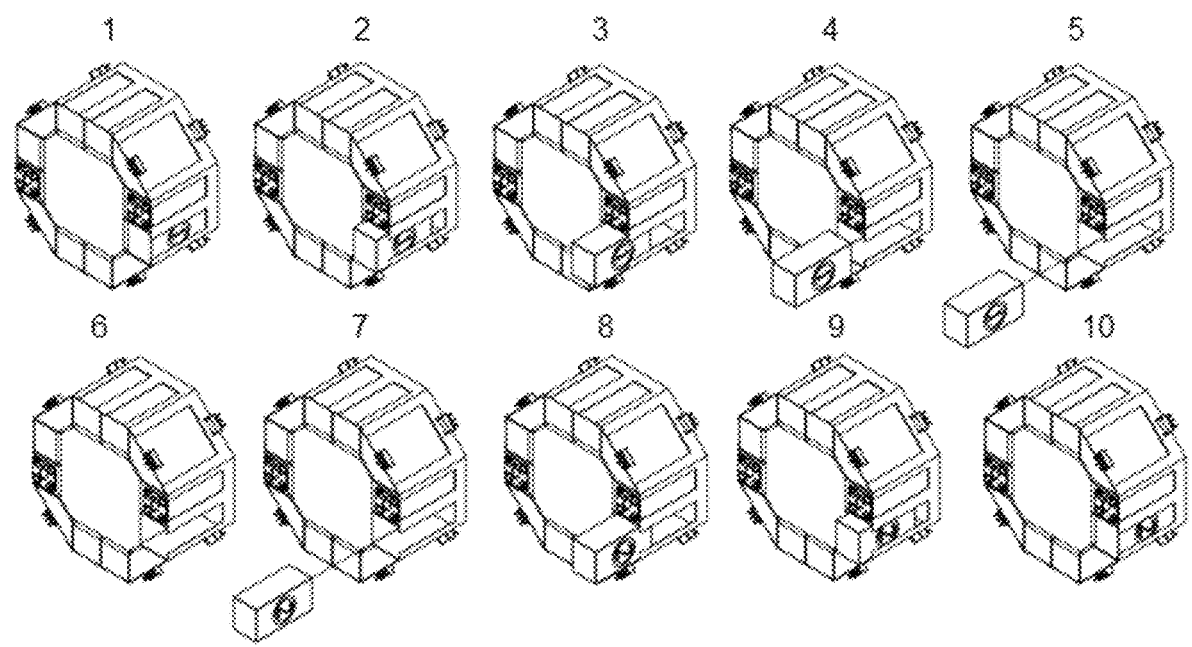
FIG. 21 are perspective views 1-10 of the spacecraft in FIG. 19 illustrating an exemplary embodiment of the movement of a housing component out of and into a compartment or open slot of the bus structure, according to the present invention.

FIG. 21 are perspective views 1-10 of spacecraft 50 in FIGS. 19-20 illustrating an exemplary embodiment of the movement of a wired or wireless ORU (e.g., 28, 29) out of and into a slot of the bus structure 30, according to the present invention; FIG. 21 is also applicable for the spacecrafts described above with reference to the other embodiments of the present invention. Spacecraft bus 30 can be assembled via humans, robotics, or other mechanisms. Spacecraft bus 30 can also eject ORU 28 or 29 in the event of a fire or other anomalies that would require immediate removal of the damaged ORU. Furthermore, spacecraft bus 30 can robotically remove or replace ORU 28 or 29 on orbit to aid in upgrading or replacing the subsystems or payloads on board.

Figure 22:
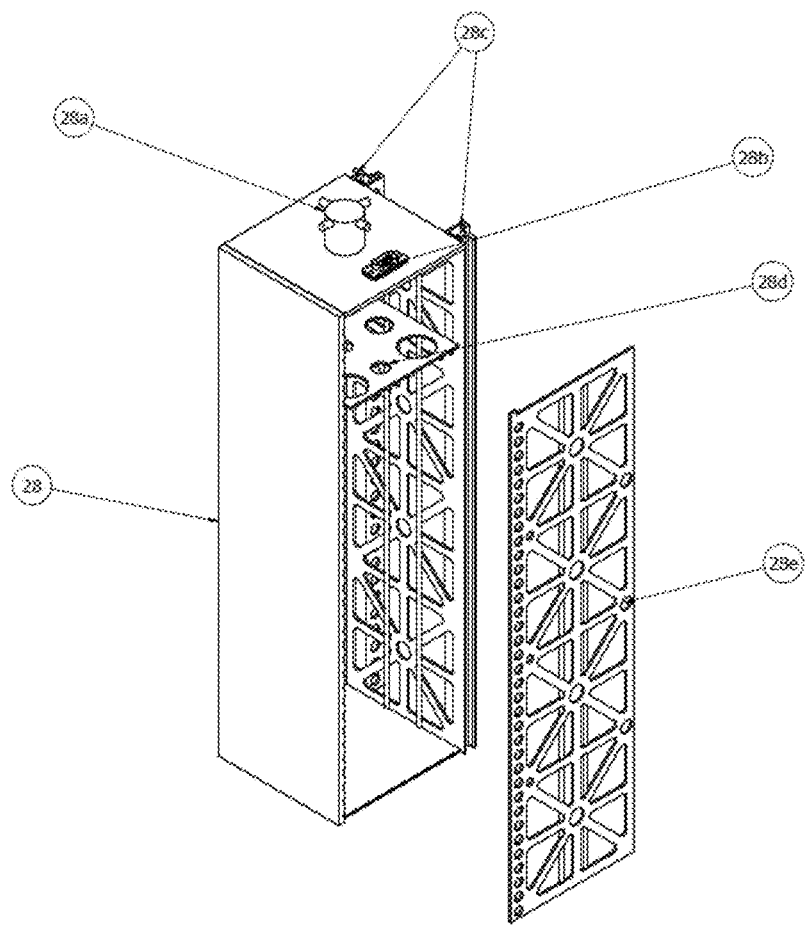
FIG. 22 is a perspective view of an elongated housing component shown in FIG. 15 illustrating the internal structure of the housing component including mounting points for payloads or subsystems, an alignment track system, an electrical/power interface port, and an external grappling mount for assembly or removal during manufacturing or on-orbit servicing, according to embodiments of the present invention.
Figure 26:
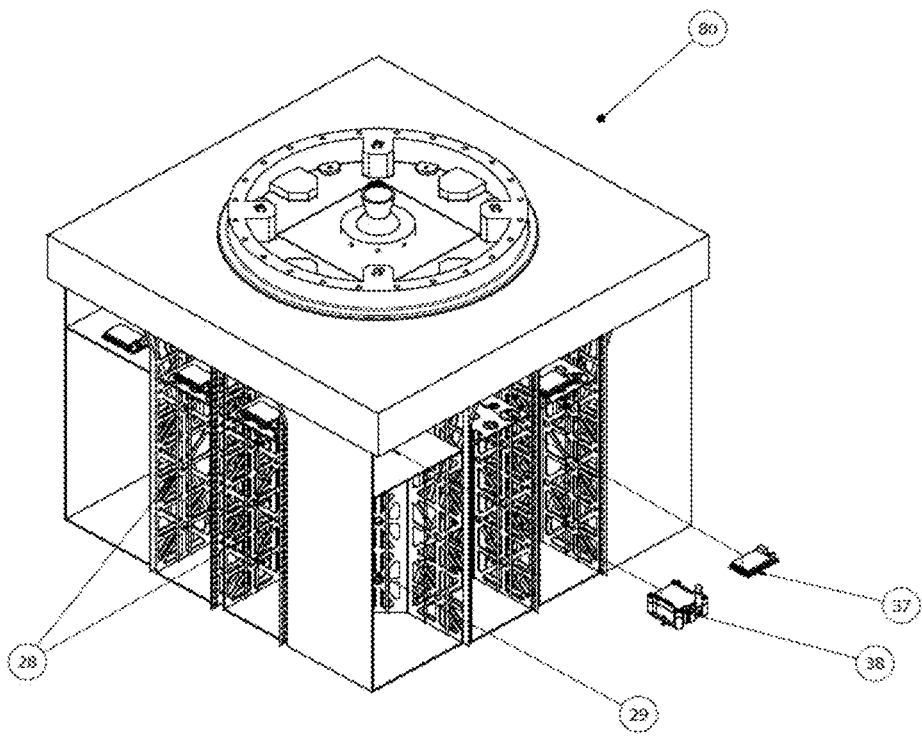
FIG. 26 is a perspective view of the spacecraft in FIG. 23 showing the internal mounting structures of the assembled housing components, the modular propulsion system in a mounted state relative to the propulsion attachment fitting, and corresponding wireless hub and wireless coordinator.
Figure 27:
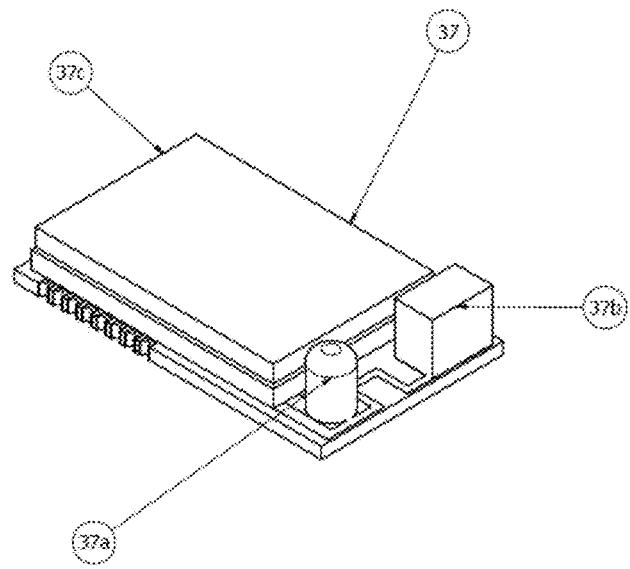
FIG. 27 shows an embodiment of the wireless hub with a built-in antenna according to an embodiment of the present invention.

FIG. 22 is a perspective view of the internal structure and mounting points 28d, 28e of ORU 28 for subsystems or payloads. FIG. 22 shows a non-conical but protruding docking interface 28a used for manipulating ORU 28 during manufacturing, assembly, or on-orbit replacement. The protruding docking interface 28a is another embodiment of a mechanical grappling fixture for the ORU 28, 29 and is intended to clearly articulate the flexibility in the ORU 28, 29 design. FIG. 22 shows the track system 28c for alignment when applying or removing an ORU from the bus structure and the electrical/power interface port or wireless hub mounting location 28b. ORU 28 is configure with a structure that surrounds an internal volume designed to house critical spacecraft components, subsystems, or payloads. ORU 28 is made of multiple faces 28e that can be organized to create various polygonal shaped structures. The inside of the ORU structure is compartmentalized with one or more plates 28d for mounting data acquisition components, processors, and the wireless router 37 (FIGS. 26-27). Critical system power and thermal management connection is provided by a standardized electrical/power interface port 28b. ORU 28 has rails 28c which provide alignment during integration or removal of the ORU and to help distribute the load of the ORU to the primary spacecraft bus structure.

Figure 23:
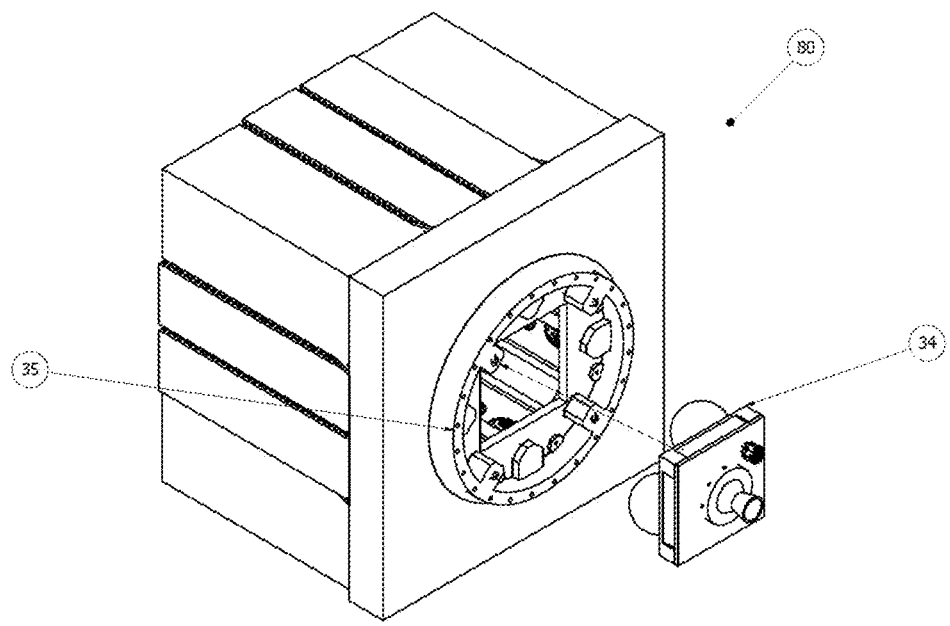
FIG. 23 is a perspective view of a reusable modular spacecraft according to another embodiment of the present invention and further illustrating a removable modular propulsion system capable of being fully integrated or removed as a single unit from a propulsion attachment fitting provided to the spacecraft bus structure.

FIG. 23 is a perspective view of a spacecraft 80 having a generally square-shaped configuration. Spacecraft 80 includes a modular propulsion element 34 as a full modular propulsion unit that can be assembled or replaced into a propulsion attachment fitting 35 as a unit during assembly or during on-orbit operations. In this embodiment, the modular propulsion element 34 mounts into the spacecraft bus propulsion attachment fitting 35 where it can use latches, magnets, adhesives, locking mechanisms, or other types of grappling mechanisms to lock into place. The modular propulsion element 34 can vary in size, shape, mass, and orientation depending on which type of propellant and propulsion system that is chosen for the specific mission. The modular propulsion element 34 houses a fill-and-drain valve for ground servicing and on-orbit refueling or draining. Modular propulsion element 34 is designed to be removed on-orbit by spacecraft 40, such as described above with reference to FIG. 14, in the event of a failure, end of life, or if the propellant is low and there was no fill-and-drain valve installed during manufacturing.

Figure 24A:
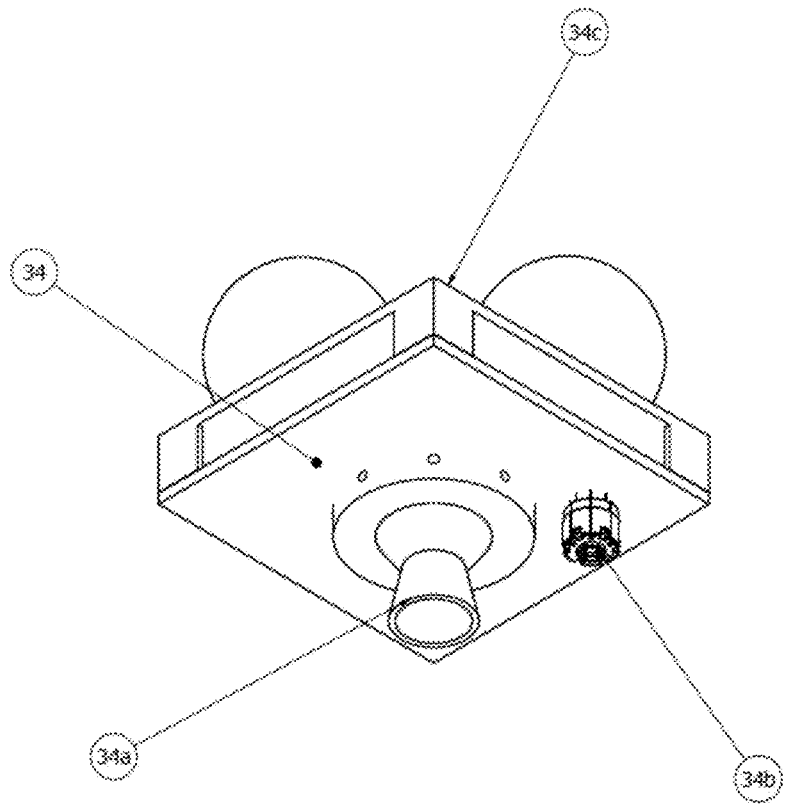
FIGS. 24A and 24B are perspective views of the modular propulsion system shown in FIG. 23 illustrating propulsion storage tanks, piping, pressurization system, electronics, refueling valve, and mounting deck of the propulsion system.
Figure 24B:
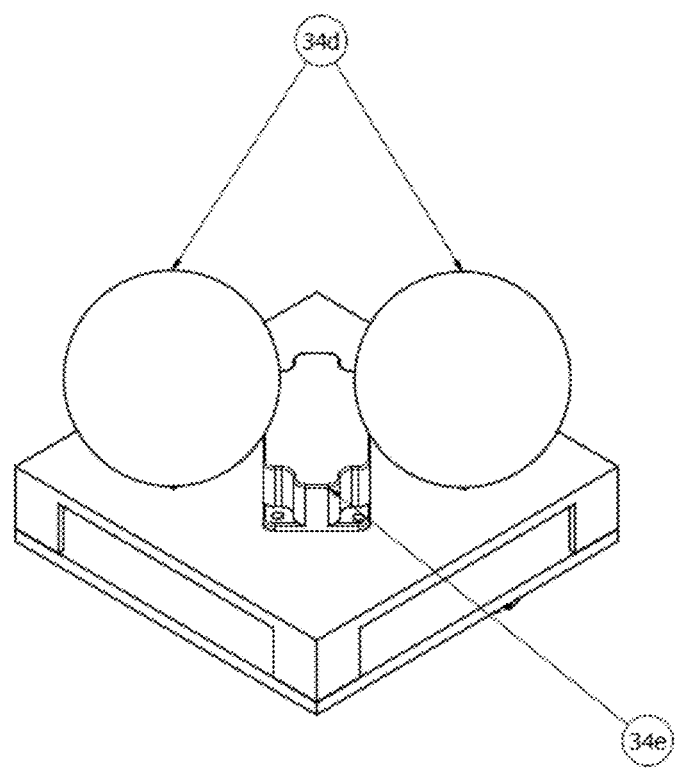

FIGS. 24a and 24b show enlarged views of the modular propulsion element 34 equipped with a thruster 34a, a modular thrust structure that facilitates integration as a single unit 34c, an integrated propellant storage 34d, and a propulsion system control box and wireless module 34e. The modular propulsion element storage tanks are filled through an integrated fill-and-drain valve 34b. The modular propulsion element can be of multiple configurations such as electric propulsion, monopropellant propulsion, nuclear propulsion, and bipropellant propulsion, and contains all necessary hardware and electronics to operate the propulsion system integrated as a single orbital replace unit. The modular propulsion element 34 is sized sufficiently to fit inside of the spacecraft's primary structure and propulsion attachment fitting 35 and can be of any geometric shape. The propulsion attachment fitting 35 is the primary mechanical interface to integrate and mount the spacecraft to the launch vehicle. The modular propulsion element 34 can accommodate a multitude of propellant and pressurization tanks (not shown) to accommodate large propellant needs. Although the propulsion element is designed to be easily integrated or removed and replaced on-orbit, it can also be refueled in space by an on-orbit servicing vehicle through the fill-and-drain valve 34*b*.

Figure 25:
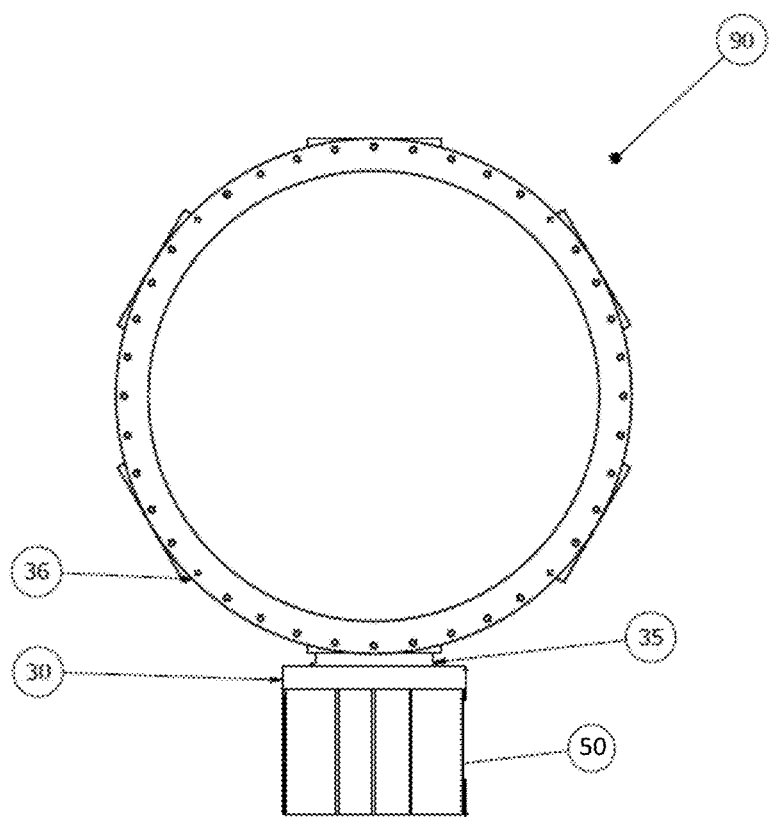
FIG. 25 is a view of the spacecraft in FIG. 23 mounted to an ESPA ring during launch configuration or mounted externally during on-orbit operations, according to embodiments of the present invention.

FIG. 25 shows the ESPA ring or launch adapter ring 90 used during launch to mount spacecraft 50 (FIG. 19) externally by a propulsion attachment fitting 35 that is mounted to a launch adapter ring's payload mounting bracket or plate 36. This ESPA ring can be machined in a variety of heights and diameters and have anywhere between 4-8 mounting points 36. All embodiments of the spacecraft bus described herein are designed to accommodate the mounting plate 36 of an ESPA or launch adapter ring 90. The spacecraft buses can be mounted externally either horizontally, vertically, or even stacked in 2-4 per plate 36 in order to accommodate more spacecrafts on the launch vehicle. The spacecraft buses can also utilize the ESPA ring or launch adapter during on-orbit operations as a core structure to store extra ORUs, fuel, payloads, subsystems, or to act as an on-orbit manufacturing facility that utilizes 3D printing, robotic arms, and other systems to assembly structures, spacecraft, or antennas on-orbit.

FIG. 26 shows a perspective view of spacecraft 80 shown in FIG. 23, and further illustrates an internal view to show ORU 28 as described above with reference to FIG. 22, the wireless router 37, and wireless coordinator 38. Spacecraft 80 shows the modular propulsion element 34 inserted and locked into the propulsion attachment fitting 35 and in operational configuration. The bottom of the square spacecraft bus 80 is on a modular propulsion side. ORUs 28, 29 are shown without the sides to illustrate the mounting brackets and flexibility the ORUs (which can be manufactured by 3D printing, casting, or CNC machining using various composite or non-composite materials) can allow for various sizes, shapes, types, or masses of subsystems or payloads. Wireless router 37 and wireless coordinator 38 are shown as to where they would be located internally of spacecraft 80. The wireless router 37 in each ORU 28 handles the routing of data and messages between the wireless coordinator 38 and the primary spacecraft computer. There can be multiple routers 37 and multiple coordinators 38 throughout the spacecraft and individual ORUs 28 that create the wireless network for the spacecraft components. Spacecraft 80 is of a square or cube shape that can accommodate a multitude of subsystems or payloads internally mounted in ORU 28 or externally mounted. Spacecraft 80 is designed to be assembled using humans or robotic arms and repaired or refueled by spacecraft 40 (FIG. 14) on-orbit.

FIG. 27 shows a perspective embodiment of one wireless router 37 that is mounted in the ORUs according to the embodiments of the present invention, and that connects to the wireless coordinator 38 mounted to one of the on-board computers (OBC). Wireless router 37 can be of various shapes, sizes, colors, orientations, and weights. Wireless router 37 is designed to match wireless coordinator 38 as they are manufactured together. This means wireless router 37 can accommodate a multitude of frequencies and communication channels or types and a multitude of antennas, depending on the requirements of the subsystem, payload, or externally mounted system. Wireless router 37 is configured with one or more antennas, mounting hardware, communications systems, PCB boards, and is capable of being modified to accommodate future advancements in wireless communications. Wireless router 37 can be mounted vertically, horizontally, in-line, translationally inside or externally of an ORU. Wireless router 37 can also be built into the structure of the ORU to accommodate more volume inside the ORU and to minimize external protrusions. Wireless router 37 is designed to be easily mounted or dismounted using magnets, bolts, or adhesives. Wireless router 37 and wireless coordinator 38 are designed to accommodate various wired connection types such as ethernet, RS422, LVDS, I2C, USB, and other connection types allowing various subsystems and payloads to communicate wirelessly across the local spacecraft network.

Figure 28:
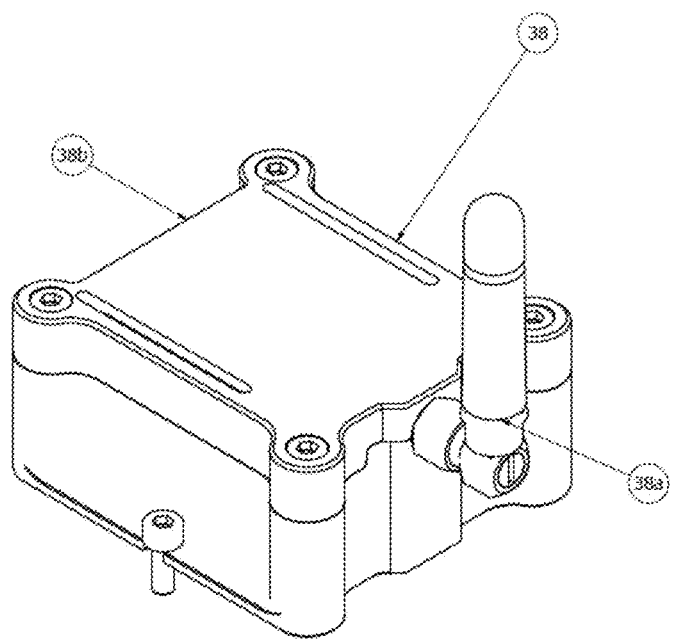
FIG. 28 shows an embodiment of the wireless coordinator with an external antenna according to an embodiment of the present invention.

FIG. 28 shows the wireless coordinator 38 that is mounted to the OBCs internally or externally on the spacecraft bus according to the embodiments of the present invention. The wireless coordinator 38 is designed to accommodate a variety of antennas across a broad spectrum of frequencies to accommodate various types of technologies related to subsystems and payloads. These antennas can be manufactured using traditional antenna manufacturing methods or can be 3D printed to reduce mass, size, and weight. The wireless coordinator can be configured across multiple wireless standards and frequencies such as IEEE 802.15.6, Bluetooth Low Energy, IEEE 802.15.4, Zigbee, Wireless HART, ISA SP100, IEEE 802.11 Wi-Fi and other frequencies and standards. The wireless coordinator communicates and transfers data or commands from the OBCs to the wireless routers 37 mounted to the ORUs and other wireless components, to external payload racks, to the launch vehicle, to externally attached spacecraft or ORUs externally attached by an on-orbit servicing vehicle, such as spacecraft bus 40 described above with reference to FIG. 14.

The wireless coordinator 38 is responsible for autonomous network configuration and relaying messages through the antenna to accommodate simple integration or removal of ORUs, payloads, or future technologies that may be added to the spacecraft on-orbit. Wireless coordinator 38 is primarily made up on an antenna, processor, power system, and communications technology designed to wirelessly communicate to the wireless routers and systems during integration, testing, on-orbit operations, and on-orbit servicing vehicles. It is also capable of transmitting wireless signals to other spacecraft within close enough proximity during on-orbit operations such as to invoke formation flying, data transfer, and communications between them. Wireless coordinator 38 is primarily responsible for all data transfer and communications between the spacecraft bus and the ORUs and therefore may have many different forms, sizes, weights, colors, and orientations. Furthermore, it may accommodate a multitude of types of antennas depending on the subsystems or payloads needs.

Figure 29:
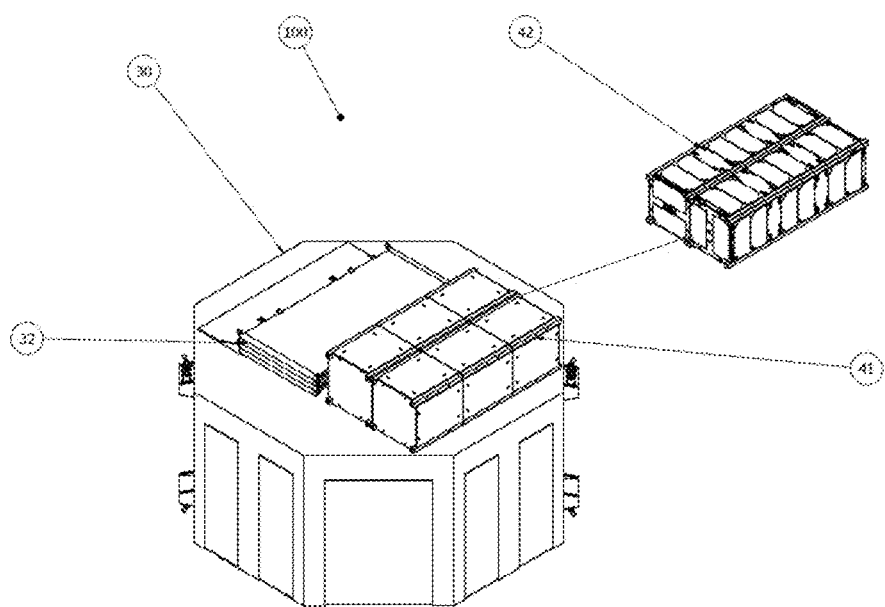
FIG. 29 shows an external payload rack mounted to a top portion of the spacecraft in FIG. 20 and further illustrating a satellite the spacecraft was carrying being deployed from a payload rack.

FIG. 29 shows a spacecraft 100 with an externally mounted payload storage rack 41 that is capable of carrying multiple types of spacecraft and deploying them on-orbit. In this embodiment, the external payload storage rack 41 has deployed a 6U CubeSat 42 from the top of the spacecraft mounting deck on the zenith side of the spacecraft bus 30 next to the solar panels 32. The payload storage rack 41 hosts a transfer interface unit 13 or a wireless router 37 that controls the deployment latch, spring, or gate that physically opens or releases to deploy the satellite. The externally mounted payload storage rack 41 can be configured vertically, horizontally, translationally or mounted on the top, side, or bottom of the spacecraft bus 30. The payload storage rack 41 can accommodate multiple spacecrafts within the deployment mechanism or a single spacecraft as depicted in FIG. 29. There is also an option to stack multiple payload storage racks vertically or horizontally from spacecraft 100 to accommodate multiple spacecraft deployments. It should further be known that the external payload storage rack can be deployed from spacecraft 100 utilizing releasing mechanisms, spring, latches, or a robotic grappler that manually removes it in order to reduce the mass constraints and center of gravity changes that arise from deploying a spacecraft from another spacecraft on-orbit. The externally mounted payload storage rack can deploy payloads horizontally, vertically, or translationally related to mounting orientation to accommodate multiple types of deployment characteristics, such as spinning, rotating, steady, or wobbling.

In the embodiments of the spacecrafts according to the present invention described herein with reference to the drawings, the bus structure is configured with a general geometric shape such as polygonal, octagonal, square, or decagon shapes, and the wireless or wired ORUs and their connectors are configured as shown in the figures. It is understood, however, that the bus structure, connectors, and ORUs are not limited to these configurations, and that other suitable configurations for the bus structure, connectors, and ORUs (e.g., triangular shaped) are suitable (e.g., the bus structure can be scaled to any number of sides) without departing from the spirit and scope of the invention.

The various components of the spacecrafts described herein, including the bus structure, ORUs, wireless connectors, and interface units, can be made of various suitable materials, including aluminum, aluminum composite materials, non-metallic space qualified composites or titanium alloys. Ceramic and carbon composites can also be used for components of the spacecrafts to provide protection from varying temperatures and environment properties found in space.

Thus, the present invention provides a multipurpose polygonal modular spacecraft adaptable for a variety of short and long-term space missions. The multipurpose spacecraft is designed to be rapidly manufactured using standard spacecraft manufacturing techniques such as CNC machining, casting or new innovative methods such as 3D printing. Furthermore, this multipurpose spacecraft is designed to be assembled by humans or robotics through the modular design, wireless connectors and standardized design which allows for reduced complexity during assembly and testing over bespoke spacecraft.

The multipurpose modular spacecraft comprises a scalable polygonal bus, interchangeable ORUs, refueling valves, grappling and docking technology for on-orbit servicing and wireless connectors or standardized electrical/power transfer interface units. The objective of this spacecraft is to provide a system capable of hosting one or multiple payloads on a single spacecraft with an extended orbital lifetime through on-orbit repairs, upgrades, and refueling.

The advanced manufactured multipurpose modular spacecraft will be fully on-orbit serviceable to extend its life, remove and replace payloads, upgrade payloads based on new requirements, and repair and refuel the spacecraft. These enhancements will enable the spacecraft to extend its flight envelope and achieve the current mission goals dictated by the payloads onboard as well as provide flexibility to support advancements in technology and future payload requirements. Furthermore, the objective of this spacecraft is to accommodate wireless communications to allow for rapid assembly and testing during manufacturing without the need for wiring design complexities, wiring mass, and the fact that there is no standard wired connectors across industry which leads to dozens of different types of connectors needed for a single spacecraft to connect and function correctly. Additionally, this multipurpose modular spacecraft has the ability to be adapted to service other spacecraft systems in orbit about the Earth by having an on-orbit servicing vehicle dock to it on-orbit and replace the ORUs with on-orbit servicing specific ORUs, robotic arms or grappling technologies as well as refuel the spacecraft.

It is appreciated from the embodiments of the spacecrafts according to the invention described herein that the ORUs can be easily removed and replaced by a version of the reusable, modular, and interchangeable spacecraft of the invention that is equipped with on-orbit servicing components to include robotic arms, laser and camera inspection hardware, and a fill-and-drain valve. The ORUs have the ability to plug and play via wireless connectors or a standardized electrical/power transfer interface component equipped on the back of the ORU. The combination of the bus, ORU, and wireless connectors or interfaces creates a reusable, modular, and interchangeable spacecraft that has the ability to rapidly adapt to a variety of mission architectures and scale in size to accommodate all types of technologies or payloads.

Moreover, the multipurpose, reusable, modular, and interchangeable spacecraft of the present invention is designed to fit in a variety of launch vehicle fairings to allow for flexibility in the availability of launch dates and locations. The bus system is volumetrically and geometrically scalable to allow for the accommodation of different launch vehicle fairing volumetric sizing, payload or subsystem requirements and orbital deployment locations. The bus system can also be mounted horizontally, translationally, or vertically on ESPA rings or other launch mounting systems to accommodate a variety of launch configurations. The same connecting points for the launch vehicles can be used as grappling surfaces for the on-orbit servicing version of this design as well as can be used to be permanently docked to structures in space, such as the International Space Station (ISS).

The previous description of the disclosure is provided to enable any person skilled in the art to make or use the disclosure. Various modifications to the disclosure will be readily apparent to those skilled in the art, and the generic principles defined herein may be applied to other variations without departing from the scope of the disclosure. Thus, the disclosure is not intended to be limited to the examples and designs described herein but are to be accorded the widest scope consistent with the principles and novel features disclosed herein.

What is claimed is:

1. A reusable modular spacecraft comprising:
a spacecraft bus structure configured to support spacecraft subsystems;
a plurality of interchangeable housing components configured to be interchangeably received and supported by said spacecraft bus structure;
said spacecraft bus structure comprising a plurality of compartment openings, each of said plurality of compartment openings configured to removably receive a respective one of said plurality of housing components;
each of said plurality of compartment openings comprising at least four inside corners, wherein each of said at least four inside corners are configured to receive a respective outside corner edge of said respective one of said plurality of housing components;
said spacecraft bus structure configured to hold each of said plurality of housing components separately from each of other of said plurality of housing components;
at least one of said plurality of compartment openings configured to hold said respective one of said plurality of housing components in an orientation that is at least substantially perpendicular with respect to another said respective one of said plurality of housing components disposed in another of said plurality of compartment openings; and a wireless system configured to permit wireless communication between each of said plurality of interchangeable housing components and spacecraft subsystems supported by said spacecraft bus structure.

2. The reusable modular spacecraft of claim 1, wherein at least one of said plurality of compartment openings of the spacecraft bus structure is provided with a track system configured to receive and position said respective one of said plurality of housing components within said at least one of said plurality of compartment openings.

3. The reusable modular spacecraft of claim 1, wherein said plurality of compartment openings are provided on a side of said spacecraft bus structure.

4. The reusable modular spacecraft of claim 1, wherein said wireless system comprises a wireless hub and a wireless component configured to be mounted to said plurality of interchangeable housing components and/or said spacecraft bus structure.

5. The reusable modular spacecraft of claim 1, wherein said spacecraft bus structure has one of a generally polygonal-, octagon-, decagon-, and square-shaped configuration.

6. The reusable modular spacecraft of claim 1, further comprising a standardized electrical/power transfer interface unit removably mounted to said plurality of interchangeable housing components for transferring electricity, power, data and/or providing thermal management/control.

7. The reusable modular spacecraft of claim 1, further comprising a propulsion system, refueling valve, and/or propulsion storage tanks removably mounted to said spacecraft bus structure.

8. The reusable modular spacecraft of claim 1, wherein said plurality of interchangeable housing components comprise an on-orbit replaceable unit (ORU) configured to house spacecraft subsystems that can be interchanged on-orbit by human mission specialists and/or robotics.

9. The reusable modular spacecraft of claim 8, wherein said ORU is configured for plug and play via a wireless connector of said wireless system or via a standardized electrical/power transfer interface component removably mounted on said ORU.

10. In combination: a launch vehicle; and a plurality of reusable modular spacecrafts according to claim 1 for positioning in a fairing of said launch vehicle.

11. In combination: a reusable modular spacecraft according to claim 1; and a robotic on-orbit servicing vehicle comprising at least one robotic arm configured for attachment to the reusable modular spacecraft.

12. In combination: a reusable modular spacecraft according to claim 1; and a payload storage rack mounted externally on said reusable modular spacecraft and configured for carrying multiple types of spacecraft and deploying them on-orbit, said payload storage rack being further configured to support a transfer interface unit or wireless router for controlling deployment of a latch, spring, or gate that physically opens or releases to deploy the spacecrafts.

13. The reusable modular spacecraft of claim 1, wherein said wireless system comprises a plurality of wireless hubs and wireless coordinators configured to be mounted to said plurality of interchangeable housing components and/or said spacecraft bus structure for transferring data among and between said plurality of interchangeable housing components.

14. The reusable modular spacecraft of claim 1, further comprising a plurality of standardized electrical/power transfer interface units removably mounted to respective ones of said plurality of interchangeable housing components for transferring electricity, power, data and/or providing thermal management/control among said plurality of interchangeable housing components.

15. The reusable modular spacecraft of claim 1, further comprising a plurality of on-orbit replaceable units (ORU); wherein each of said plurality of interchangeable housing components comprises one of said plurality of ORU configured to house spacecraft subsystems that can be interchanged on-orbit by human mission specialists and/or robotics.

16. The reusable modular spacecraft of claim 15, wherein each said plurality of ORU is configured for plug and play via a wireless connector or an electrical/power transfer interface component removably mounted on each of said plurality of ORU.

17. A spacecraft bus structure comprising: a structural body having a plurality of compartments each provided with an opening for selectively receiving and supporting therein a respective one of a plurality of on-orbit replaceable units (ORU) configured to house spacecraft subsystems that can be interchanged on-orbit by human mission specialists and/or robotics, said plurality of compartments each comprising at least four inside corners, each of said at least four inside corners configured to receive a respective outside corner edge of said respective one of said plurality ORU, and said spacecraft bus structure configured to hold each of said plurality of ORU separately from every other of said plurality of ORU.

18. The spacecraft bus structure of claim 17, wherein each ORU is configured for plug and play via a wireless connector or an electrical/power transfer interface component removably mounted on the ORU.

* * * * *